United States Patent
Dhanoa et al.

(10) Patent No.: US 8,307,021 B1
(45) Date of Patent: Nov. 6, 2012

(54) HARDWARE ARCHITECTURE AND SCHEDULING FOR HIGH PERFORMANCE SOLUTION TO CHOLESKY DECOMPOSITION

(75) Inventors: Kulwinder Dhanoa, Windsor (GB); Michael Fitton, London (GB)

(73) Assignee: Altera Corporation, San Jose, CA (US)

( * ) Notice: Subject to any disclaimer, the term of this patent is extended or adjusted under 35 U.S.C. 154(b) by 1282 days.

(21) Appl. No.: 12/072,144

(22) Filed: Feb. 25, 2008

(51) Int. Cl.
*G06F 7/00* (2006.01)
(52) U.S. Cl. ...................................... 708/200
(58) Field of Classification Search .................. 708/100, 708/190, 200
See application file for complete search history.

(56) References Cited

U.S. PATENT DOCUMENTS

| | | | |
|---|---|---|---|
| 4,493,048 A | 1/1985 | Kung et al. | |
| 4,727,503 A | 2/1988 | McWhirter | |
| 5,018,065 A | 5/1991 | McWhirter et al. | |
| 5,251,270 A * | 10/1993 | Toyoda | 382/275 |
| 5,475,793 A | 12/1995 | Broomhead et al. | |
| 5,717,621 A | 2/1998 | Gupta et al. | |
| 6,675,187 B1 | 1/2004 | Greenberger | |
| 7,180,969 B1 * | 2/2007 | Erving et al. | 375/348 |
| 7,219,119 B2 * | 5/2007 | Briemle et al. | 708/520 |
| 7,366,326 B2 | 4/2008 | Chang et al. | |
| 7,492,844 B2 * | 2/2009 | Kansanen et al. | 375/350 |
| 7,716,454 B2 | 5/2010 | Fitton | |
| 7,933,353 B2 | 4/2011 | Maltsev et al. | |
| 7,979,673 B2 | 7/2011 | Fitton | |
| 2009/0116588 A1 | 5/2009 | Mcnamara et al. | |

FOREIGN PATENT DOCUMENTS

EP    1 772 809 A2    4/2007

OTHER PUBLICATIONS

Fitton et al., "Reconfigurable Antenna Processing with Matrix Decomposition using FPGA based Application Specific Integrated Processors," In 2004 Software Defined Radio Technical Conference, 2004.
Moreno et al., "Linear pseudosystolic array for partitioned matrix algorithms," Journal of VLSI and Signal Processing, vol. 3, pp. 201-214, 1991.
Lightbody et al., "Novel mapping of a linear QR architecture," Proc. ICASSP, vol. IV, pp. 1933-1936, 1999.

* cited by examiner

*Primary Examiner* — Cheryl Lewis
(74) *Attorney, Agent, or Firm* — Mauriel Kapouytian Treffert; Ararat Kapouytian

(57) ABSTRACT

A matrix decomposition circuit is described. In one implementation, the matrix decomposition circuit includes a memory, one or more memory counters to track one or more memory counter values regarding data stored in the memory, a processing unit that calculates elements of an output matrix, and a scheduler that determines an order for calculating the elements of the output matrix, where the scheduler uses one or more memory counter values to determine whether data needed for processing an element of the output matrix is available in the memory. In one specific implementation, the scheduler schedules processing of a diagonal element of the output matrix to occur as soon as the scheduler determines that each element of the output matrix needed for calculating the diagonal element is available in the memory.

25 Claims, 11 Drawing Sheets

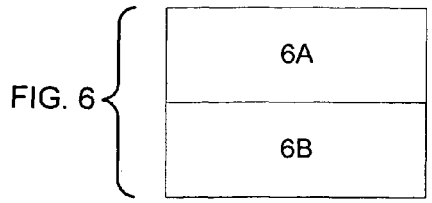

| | | 620 | | 630 | | |
| 610 | | 621 622 | | 631 632 | | 640 |

| Scheduling Element | | EVEN memory reads | | ODD memory reads | | Special Instructions to PU |
|---|---|---|---|---|---|---|
| Col No | Output Element | Port A | Port B | Port A | Port B | |
| 0 | $l_{11}$ | $a_{11}$ | | | | |
| 0 | $l_{21}$ | $a_{21}$ | $l_{11}$ | | | |
| 0 | $l_{31}$ | $a_{31}$ | | | | Use stored diag $l_{11}$ |
| 0 | $l_{41}$ | $a_{41}$ | | | | Use stored diag $l_{11}$ |
| 1 | $l_{22}$ | $l_{21}$ | | $a_{22}$ | | Use conjugate of $l_{21}$ |
| 0 | $l_{51}$ | $a_{51}$ | | | | Use stored diag $l_{11}$ |
| 0 | $l_{61}$ | $a_{61}$ | | | | Use stored diag $l_{11}$ |
| 0 | $l_{71}$ | $a_{71}$ | | | | Use stored diag $l_{11}$ |
| 1 | $l_{32}$ | $l_{31}$ | $l_{21}$ | $a_{32}$ | $l_{22}$ | |
| 1 | $l_{42}$ | $l_{41}$ | | $a_{42}$ | | Use stored diag $l_{22}$ & even element $l_{21}$ |
| 1 | $l_{52}$ | $l_{51}$ | | $a_{52}$ | | Use stored diag $l_{22}$ & even element $l_{21}$ |
| 2 | $l_{33}$ | $l_{31}$ | | | | Use conjugate of $l_{31}$ |
| | | $a_{33}$ | | $l_{32}$ | | Use conjugate of $l_{32}$ |
| 1 | $l_{62}$ | $l_{61}$ | | $a_{62}$ | | Use stored diag $l_{22}$ & even element $l_{21}$ |
| 1 | $l_{72}$ | $l_{71}$ | | $a_{72}$ | | Use stored diag $l_{22}$ & even element $l_{21}$ |
| 2 | $l_{43}$ | $l_{41}$ | $l_{31}$ | | | |
| | | $a_{43}$ | $l_{33}$ | $l_{42}$ | $l_{32}$ | |
| 2 | $l_{53}$ | $l_{51}$ | | | | Use stored diag $l_{33}$ & even element $l_{31}$ |
| | | $a_{53}$ | | $l_{52}$ | | Use stored odd element $l_{32}$ |
| 3 | $l_{44}$ | $l_{41}$ | | $a_{44}$ | | Use conjugate of $l_{41}$ |
| | | | | $l_{42}$ | | Use conjugate of $l_{42}$ |
| | | $l_{43}$ | | | | Use conjugate of $l_{43}$ |
| 2 | $l_{63}$ | $l_{61}$ | | | | Use stored diag $l_{33}$ & even element $l_{31}$ |
| | | $a_{63}$ | | $l_{62}$ | | Use stored odd element $l_{32}$ |
| 2 | $l_{73}$ | $l_{71}$ | | | | Use stored diag $l_{33}$ & even element $l_{31}$ |
| | | $a_{73}$ | | $l_{72}$ | | Use stored odd element $l_{32}$ |

| | | | | | | |
|---|---|---|---|---|---|---|
| 3 | $l_{54}$ | $l_{51}$ | $l_{41}$ | $a_{54}$ | $l_{44}$ | |
| | | | | $l_{52}$ | $l_{42}$ | |
| | | | $l_{53}$ | $l_{43}$ | | |
| 3 | $l_{64}$ | $l_{61}$ | $l_{41}$ | $a_{64}$ | | Use stored diag $l_{44}$ |
| | | | | $l_{62}$ | | Use stored odd element $l_{42}$ |
| | | | $l_{63}$ | $l_{43}$ | | |
| 4 | $l_{55}$ | $l_{51}$ | | | | Use conjugate of $l_{51}$ |
| | | $a_{55}$ | | $l_{52}$ | | Use conjugate of $l_{52}$ |
| | | $l_{53}$ | | | | Use conjugate of $l_{53}$ |
| | | | | $l_{54}$ | | Use conjugate of $l_{54}$ |
| 3 | $l_{74}$ | $l_{71}$ | $l_{41}$ | $a_{74}$ | | Use stored diag $l_{44}$ |
| | | | | $l_{72}$ | | Use stored odd element $l_{42}$ |
| | | | $l_{73}$ | $l_{43}$ | | |
| 4 | $l_{65}$ | $l_{61}$ | $l_{51}$ | | | |
| | | $a_{65}$ | $l_{55}$ | $l_{62}$ | $l_{52}$ | |
| | | $l_{63}$ | $l_{53}$ | | | |
| | | | | $l_{64}$ | $l_{54}$ | |
| 4 | $l_{75}$ | $l_{71}$ | $l_{51}$ | | | |
| | | $a_{75}$ | | $l_{72}$ | $l_{52}$ | Use stored diag $l_{55}$ |
| | | $l_{73}$ | $l_{53}$ | | | |
| | | | | $l_{74}$ | $l_{54}$ | |
| 5 | $l_{66}$ | $l_{61}$ | | $a_{66}$ | | Use conjugate of $l_{61}$ |
| | | | | $l_{62}$ | | Use conjugate of $l_{62}$ |
| | | $l_{63}$ | | | | Use conjugate of $l_{63}$ |
| | | | | $l_{64}$ | | Use conjugate of $l_{64}$ |
| | | $l_{65}$ | | | | Use conjugate of $l_{65}$ |
| 5 | $l_{76}$ | $l_{71}$ | $l_{61}$ | $a_{76}$ | $l_{66}$ | |
| | | | | $l_{72}$ | $l_{62}$ | |
| | | $l_{73}$ | $l_{63}$ | | | |
| | | | | $l_{74}$ | $l_{64}$ | |
| | | $l_{75}$ | $l_{65}$ | | | |
| 6 | $l_{77}$ | $l_{71}$ | | | | Use conjugate of $l_{71}$ |
| | | $a_{77}$ | | $l_{72}$ | | Use conjugate of $l_{72}$ |
| | | $l_{73}$ | | | | Use conjugate of $l_{73}$ |
| | | | | $l_{74}$ | | Use conjugate of $l_{74}$ |
| | | $l_{75}$ | | | | Use conjugate of $l_{75}$ |
| | | | | $l_{76}$ | | Use conjugate of $l_{76}$ |

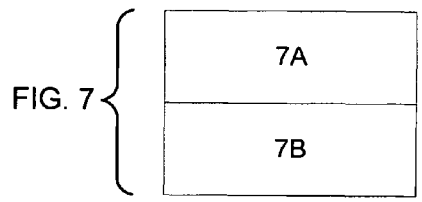

| | Scheduling Element | | EVEN memory reads | | ODD memory reads | | Special Instructions to PU |
|---|---|---|---|---|---|---|---|
| M No | Output Element | Port A | Port B | Port A | Port B | |
| 0 | $l_{11}$ | $a_{11}$ | | | | |
| 1 | $l_{11}$ | $a_{11}$ | | | | |
| 2 | $l_{11}$ | $a_{11}$ | | | | |
| ... | ... | ... | ... | ... | ... | ... |
| M | $l_{11}$ | $a_{11}$ | | | | |
| 0 | $l_{21}$ | $a_{21}$ | $l_{11}$ | | | |
| 0 | $l_{31}$ | $a_{31}$ | | | | Use stored diag $l_{11}$ |
| 0 | $l_{41}$ | $a_{41}$ | | | | Use stored diag $l_{11}$ |
| 1 | $l_{21}$ | $a_{21}$ | $l_{11}$ | | | |
| 1 | $l_{31}$ | $a_{31}$ | | | | Use stored diag $l_{11}$ |
| 1 | $l_{41}$ | $a_{41}$ | | | | Use stored diag $l_{11}$ |
| 0 | $l_{22}$ | $l_{21}$ | | $a_{22}$ | | Use conjugate of $l_{21}$ |
| 1 | $l_{22}$ | $l_{21}$ | | $a_{22}$ | | Use conjugate of $l_{21}$ |
| ... | ... | ... | ... | ... | ... | ... |
| M | $l_{21}$ | $a_{21}$ | $l_{11}$ | | | |
| M | $l_{31}$ | $a_{31}$ | | | | Use stored diag $l_{11}$ |
| M | $l_{41}$ | $a_{41}$ | | | | Use stored diag $l_{11}$ |
| M | $l_{22}$ | $l_{21}$ | | $a_{22}$ | | Use conjugate of $l_{21}$ |
| 0 | $l_{32}$ | $l_{31}$ | $l_{21}$ | $a_{32}$ | $l_{22}$ | |
| 0 | $l_{42}$ | $l_{41}$ | | $a_{42}$ | | Use stored diag $l_{22}$ & even element $l_{21}$ |
| 0 | $l_{33}$ | $l_{31}$ | | | | Use conjugate of $l_{31}$ |
| | | $a_{33}$ | | $l_{32}$ | | Use conjugate of $l_{32}$ |

FIG. 7A

| | | | | | | |
|---|---|---|---|---|---|---|
| 1 | $l_{32}$ | $l_{31}$ | $l_{21}$ | $a_{32}$ | $l_{22}$ | |
| 1 | $l_{42}$ | $l_{41}$ | | $a_{42}$ | | Use stored diag $l_{22}$ & even element $l_{21}$ |
| 1 | $l_{33}$ | $l_{31}$ | | | | Use conjugate of $l_{31}$ |
| | | $a_{33}$ | | $l_{32}$ | | Use conjugate of $l_{32}$ |
| ... | ... | ... | ... | ... | ... | ... |
| M | $l_{32}$ | $l_{31}$ | $l_{21}$ | $a_{32}$ | $l_{22}$ | |
| M | $l_{42}$ | $l_{41}$ | | $a_{42}$ | | Use stored diag $l_{22}$ & even element $l_{21}$ |
| ... | ... | ... | ... | ... | ... | ... |
| M | $l_{33}$ | $l_{31}$ | | | | Use conjugate of $l_{31}$ |
| | | $a_{33}$ | | $l_{32}$ | | Use conjugate of $l_{32}$ |
| 0 | $l_{43}$ | $l_{41}$ | $l_{31}$ | | | |
| | | $a_{43}$ | $l_{33}$ | $l_{42}$ | $l_{32}$ | |
| 1 | $l_{43}$ | $l_{41}$ | $l_{31}$ | | | |
| | | $a_{43}$ | $l_{33}$ | $l_{42}$ | $l_{32}$ | |
| 2 | $l_{43}$ | $l_{41}$ | $l_{31}$ | | | |
| | | $a_{43}$ | $l_{33}$ | $l_{42}$ | $l_{32}$ | |
| 0 | $l_{44}$ | $l_{41}$ | | $a_{44}$ | | Use conjugate of $l_{41}$ |
| | | | | $l_{42}$ | | Use conjugate of $l_{42}$ |
| | | $l_{43}$ | | | | Use conjugate of $l_{43}$ |
| 3 | $l_{43}$ | $l_{41}$ | $l_{31}$ | | | |
| | | $a_{43}$ | $l_{33}$ | $l_{42}$ | $l_{32}$ | |
| ... | ... | ... | ... | ... | ... | ... |
| M | $l_{43}$ | $l_{41}$ | $l_{31}$ | | | |
| | | $a_{43}$ | $l_{33}$ | $l_{42}$ | $l_{32}$ | |
| M | $l_{44}$ | $l_{41}$ | | $a_{44}$ | | Use conjugate of $l_{41}$ |
| | | | | $l_{42}$ | | Use conjugate of $l_{42}$ |
| | | $l_{43}$ | | | | Use conjugate of $l_{43}$ |

HARDWARE ARCHITECTURE AND SCHEDULING FOR HIGH PERFORMANCE SOLUTION TO CHOLESKY DECOMPOSITION

BACKGROUND

The present invention relates to matrix decomposition.

It is sometimes desirable to decompose a matrix A into other matrices. There are many types of matrix decomposition, an example of which is Cholesky decomposition. In Cholesky decomposition a positive definite matrix A is factorized into matrices L and $L^H$ such that:

$$A=LL^H,$$

where L is a lower triangular matrix having positive values on its diagonal, and $L^H$ is the Hermitian transpose of L.

While positive-definite matrices are special, they are quite frequent in wireless communication applications. Their factorization is therefore of some interest. Decomposing A into a lower (and upper) triangular matrix can be useful when solving simultaneous equations. L and $L^H$ can be used in forward and backward substitution to obtain the coefficient values.

Below is a general outline of the steps of the Cholesky algorithm for decomposing an input matrix A into an output matrix L. In the below description, $a_{ij}$ refers to an element of the matrix A in row i and column j, $l_{ij}$ refers to an element of the matrix L in row i and column j, elements of either matrix where i is equal to j are referred to as diagonal elements, and i and j are non-zero positive integers that range from 1 to n (where n is an integer representing the size of the matrices A and L). The general steps of the Cholesky algorithm are as follows:

1. Set all elements of L above the main diagonal equal to zero;
2. Set $l_{11}=\sqrt{a_{11}}$;
3. Generate the remaining values of column 1 as: $l_{i1}=a_{i1}/l_{11}$;
4. Set j=2;
5. IF j=n+1 THEN
    Stop; (algorithm completed)
    ELSE
    Define $L'_i$ to be a column vector of dimension j−1 whose components are the first j−1 elements in the $i^{th}$ row of L;
    END IF
    (i=j, j+1, j+2, . . . , n);
6. Calculate $j^{th}$ column of L;
    IF i=j THEN // Calculate diagonal element
    $l_{jj}=\sqrt{a_{ij}-\langle L'_j,L'_j\rangle}$;

(where $\langle L'_j,L'_j\rangle$ denotes the inner product of vectors $L'_j$ and $L'_j$)
    ELSE // Calculate non-diagonal element
    $l_{ij}=(a_{ij}-\langle L'_i,L'_j\rangle)/l_{jj}$;
    END IF i=(j, j+1, . . . , n);
7. Increment j; and
8. Go to step 5

The above method essentially involves the following. For each column of L, starting from the first column and proceeding to the other columns in order of increasing column number, the diagonal element and then the non-diagonal elements are calculated. The non-diagonal elements are calculated starting with the non-diagonal element immediately below the diagonal element and proceeding down the column in order of increasing row numbers. Once both the diagonal and all non-diagonal elements for a column are calculated, the process proceeds to calculating the diagonal and non-diagonal elements of the next column. This process is continued until the elements of all columns of L are calculated.

As an example, the calculations required for decomposing a 4 by 4 input matrix A into a 4 by 4 output matrix L are listed below. Input matrix A and output matrix L have the following general form:

$$A = \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \quad L = \begin{pmatrix} l_{11} & 0 & 0 & 0 \\ l_{21} & l_{22} & 0 & 0 \\ l_{31} & l_{32} & l_{33} & 0 \\ l_{41} & l_{42} & l_{43} & l_{44} \end{pmatrix}$$

For generating elements of column 1 of L, the following calculations are performed in the order shown:

$$l_{11}=\sqrt{a_{11}}$$

$$l_{21}=a_{21}/l_{11}$$

$$l_{31}=a_{31}/l_{11}$$

$$l_{41}=a_{41}/l_{11}$$

For generating elements of column 2 of L, the following calculations are performed in the order shown:

$$l_{22}=\sqrt{a_{22}-l_{21}\times l_{21}^*} \text{ (where } l_{21}^* \text{ denotes the conjugate of } l_{21})$$

$$l_{32}=(a_{32}-l_{31}\times l_{21}^*)/l_{22}$$

$$l_{42}=(a_{42}-l_{41}\times l_{21}^*)/l_{22}$$

For generating elements of column 3 of L, the following calculations are performed in the order shown:

$$l_{33}=\sqrt{a_{33}-l_{31}\times l_{31}^*-l_{32}\times l_{32}^*} \text{ (where } l_{31}^* \text{ and } l_{32}^* \text{ are the conjugates of } l_{31} \text{ and } l_{32}, \text{ respectively)}$$

$$l_{43}=(a_{43}-l_{41}\times l_{31}^*-l_{42}\times l_{32}^*)/l_{22}$$

For generating elements of column 4 of L, the following calculation is performed:

$$l_{44}=\sqrt{a_{44}-l_{41}\times l_{41}^*-l_{42}\times l_{42}^*-l_{43}\times l_{43}^*} \text{ (where } l_{41}^*, l_{42}^*, \text{ and } l_{43}^* \text{ are the conjugates of } l_{41}, l_{42}, \text{ and } l_{43}, \text{ respectively)}$$

Among other things, the inventors of the present invention have observed that the above generic order for calculating elements of the output matrix L may be modified to improve the throughput for generating the output matrix L.

SUMMARY

The present invention provides a matrix decomposition circuit that includes a memory, one or more memory counters to track one or more memory counter values regarding data stored in the memory, a processing unit that calculates elements of an output matrix, and a scheduler that determines an order for calculating the elements of the output matrix, where the scheduler uses one or more memory counter values to determine whether data needed for processing an element of the output matrix is available in the memory.

In one embodiment, the scheduler schedules processing of a diagonal element of the output matrix to occur as soon as the scheduler determines that each element of the output matrix needed for calculating the diagonal element is available in the memory.

Also, in one embodiment, the memory includes an odd memory and an even memory, where the odd memory stores elements of odd columns of an input matrix and elements of odd columns of the output matrix, and the even memory stores elements of even columns of the input matrix and elements of even columns of the output matrix. In this embodiment, the scheduler reads required data from the odd memory via a first port and a second port of the odd memory and from the even memory via a first port and a second port of the even memory, and the processing unit writes output data to the odd and even memories via the second ports on these memories.

The architecture and processing order of the matrix decomposition circuits of the present invention allow for achieving high throughput.

BRIEF DESCRIPTION OF THE DRAWINGS

The novel features of the invention are set forth in the appended claims. However, for purpose of explanation, several aspects of particular embodiments of the invention are described by reference to the following figures.

FIG. 6A-6B is a table illustrating one embodiment of single matrix decomposition.

FIG. 7A-7B is a table illustrating one embodiment of multiple matrix decomposition.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
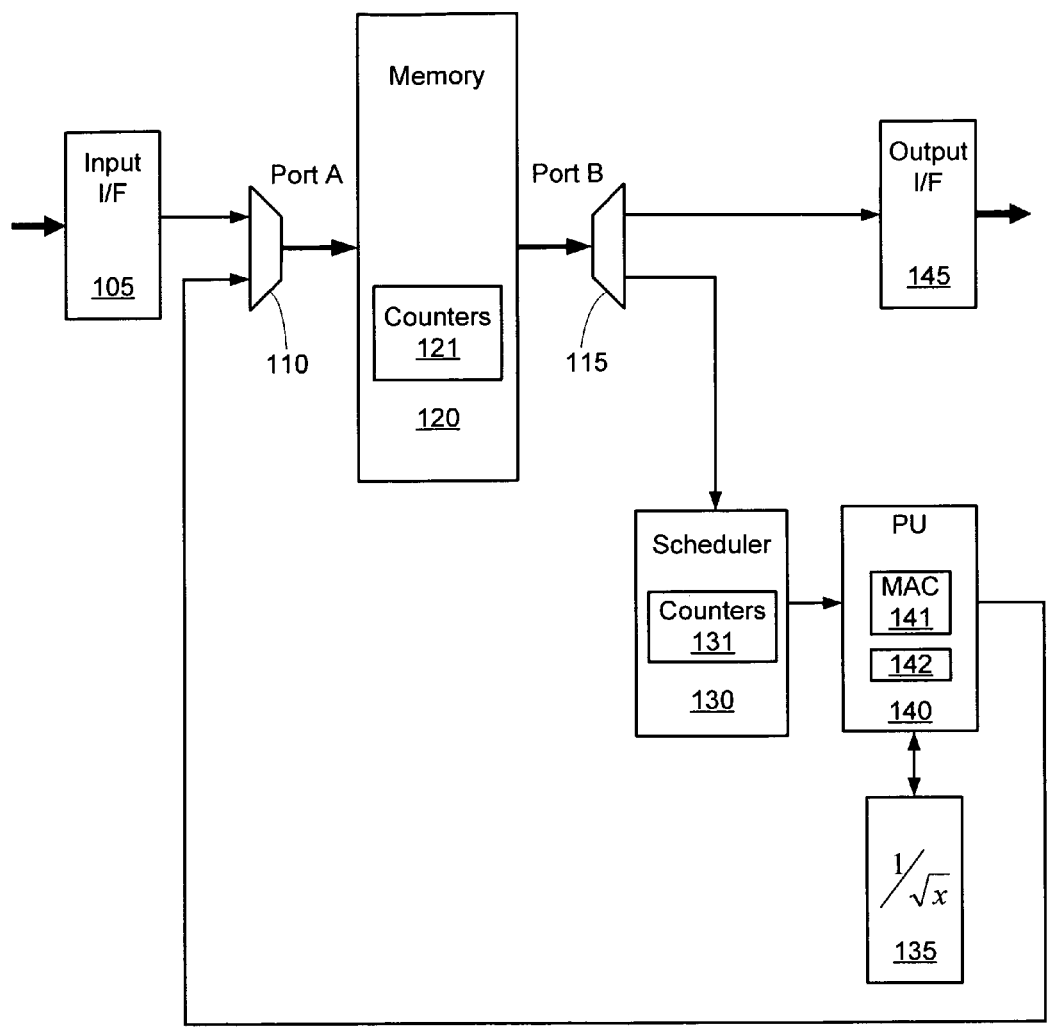
FIG. 1 is a block diagram of one embodiment of the matrix decomposition circuit of the present invention.

FIG. 1 is a block diagram of one embodiment of the matrix decomposition circuit of the present invention. In FIG. 1, matrix decomposition circuit 100 includes input interface (I/F) 105, multiplexer 110, memory 120, memory counters 121 associated with memory 120, demultiplexer 115, scheduler 130 with scheduler counters 131, inverse square root unit 135, processing unit (PU) 140, and output I/F 145, which are coupled as shown. The term multiplexer is herein used as a generic term to refer to a multiplexer, a demultiplexer, or a multiplexer-demultiplexer combination. For ease of illustration, memory counters 121 are shown as being part of memory 120. In one embodiment, however, memory counters 121 are not part of memory 120. Instead, they are simply coupled to memory 120. Matrix decomposition circuit 100 receives elements of an input matrix (e.g., matrix A) via input I/F 105 and outputs elements of an output matrix (e.g., matrix L) via output I/F 145.

Elements of an input matrix received via input I/F 105 are stored in memory 120. Similarly, elements of an output matrix calculated by matrix decomposition circuit 100, more specifically by PU 140 and inverse square root unit 135 of matrix decomposition circuit 100, are stored in memory 120. In one embodiment, memory 120 is a dual port memory with ports A and B. Scheduler 130 schedules the processing of the elements of the output matrix. In other words, scheduler 130 determines the processing order of the output elements. Multiplexer 110 selects between inputs received from input I/F 105 and PU 140 for forwarding to memory 120 via port A of memory 120. Similarly, demultiplexer 115 forwards data read via port B of memory 120 to output I/F 145 or scheduler 130.

In one embodiment, matrix decomposition circuit 100 generally operates as follows. Input data, i.e., elements of the input matrix, are received by memory 120 by way of input I/F 105 and multiplexer 110. The input data is written into memory 120 via port A of memory 120. Scheduler 130 determines whether the data required for processing an output element is available in memory 120. In one embodiment, scheduler 130 makes this determination for each output element. Thereafter, scheduler 130 generates the addresses of required data in memory 120 and reads the required data from memory 120 via port B of memory 120 by way of demultiplexer 115. In one embodiment, scheduler 130 schedules an output element for processing only if the required data for calculating the output element is available in memory 120. The required data are data required for calculating elements of the output matrix. The required data may also herein be referred to as the "data required", "data needed", or "needed data" or other similar terms. In some case, e.g., when calculating element $l_{11}$ of the output matrix, only an element of the input matrix, e.g., element $a_{11}$, is required. In other cases, elements of both the input matrix and output matrix are required for calculating elements of the output matrix. This is true for calculating all elements of the output matrix other than element $l_{11}$ of the output matrix. Scheduler 130 forwards the required data (along with control information) to PU 140. PU 140 calculates the square of output diagonal elements (i.e., $a_{jj} - \langle L'_j, L'_j \rangle$) and forwards the result to the inverse square root unit 135. The inverse square root unit 135 using the square of output diagonal elements calculates the inverse of the diagonal element and sends the result back to PU 140. Using the inverse of the diagonal element and other required data received from memory 120, PU 140 calculates non-diagonal elements (i.e., $$(a_{ij} - \langle L'_i, L'_j \rangle) * \frac{1}{L_{jj}})$$

of the output matrix. PU 140 writes output data to memory 120 via port A. It is to be noted that the control of calculations (performed by scheduler 130) is separated from the actual calculations of results (performed by PU 140 and inverse square root unit 135). It is also to be noted that PU 140 merely carries out calculations based on data and control instructions it receives from scheduler 130.

In one embodiment, the inverse of the diagonal element, i.e., 1/(the diagonal element), rather than the diagonal element is stored in memory 120. As noted above, the inverse of the diagonal element is used in calculating non-diagonal elements. The inverse of the diagonal element is also used when performing back or forward substitution to determine coefficient values, e.g., variable values for a vector matrix that is multiplied by the output matrix. As such, in one embodiment, there is no need to calculate the diagonal element and store that value in memory. Instead, calculating the inverse of the diagonal element and storing that in memory is sufficient. As used herein, diagonal element may refer to either the diagonal element, the square of the diagonal element, or the inverse of the diagonal element. Those skilled in the art would recognize from the context whether the diagonal element means the diagonal element itself, the square of the diagonal element, or the inverse of the diagonal element. Also, as used herein, the term "element of an output matrix" is used broadly enough to include the square and the inverse of a diagonal element of the output matrix. Divides generally consume more resources and take longer in terms of clock cycles than multiplications. The inverse of the diagonal element is required in three contexts: Cholesky decomposition, back substitution, and forward substitution. Thus, it makes sense to calculate the inverse of the diagonal element once and then use multiplications in the remainder of the Cholesky decomposition where this inverse is used and also use multiplications in forward and back substitutions.

In one embodiment, PU 140 includes a multiply and accumulate (MAC) unit 141 and buffers 142. In one embodiment, MAC unit 141 performs the above-mentioned calculations made by PU 140. In one embodiment, buffers 142 store a diagonal element of the output matrix (e.g., the last diagonal element of the output matrix received from scheduler 130) and non-diagonal elements of the output matrix (e.g., a last non-diagonal element of an even column and a last non diagonal element of an odd column of the output matrix). Also, in one embodiment, buffers 142 store results of calculations performed by PU 140.

In one embodiment, as memory 120 is a dual port memory, scheduler 130 may read data from memory 120 via port B while PU 140 writes data to memory 120 via port A. Elements of the output matrix are read out of memory 120 via port B and are sent to output I/F 145 by way of demultiplexer 115.

As noted above, memory 120 stores elements of both the input matrix and the output matrix. As noted above, in one embodiment, the output matrix is a lower triangular matrix, i.e., a matrix where for each column, elements above the diagonal element of the column have a value equal to zero. In one embodiment, the depth of memory 120, i.e., the number of locations for storing elements of the input and output matrices, is large enough to store the non-zero elements of the output matrix. In one embodiment, this depth is equal to $(n^2+n)/2$, where n is an integer that represents the number of columns (or rows) of the output matrix. The variable n may also herein be referred to as n or N. As used herein, non-zero elements of the output matrix refers to the diagonal elements and elements below the diagonal elements of the output matrix. It is to be noted that some of these elements may have values equal to zero. Thus, "non-zero elements" refers not to the value of the elements but to their position within the matrix. In one embodiment, as the elements of the input matrix are read, those memory locations may thereafter be used to store elements of the output matrix, minimizing memory usage.

In one embodiment, memory counters 121 include five counters for tracking the write operations being made to memory 120. In one embodiment, the five counters keep track of the following: (1) memwr_diag_col_no which indicates the column number of the last diagonal element written to memory (does not increment until all diagonals for a particular column C for all matrices have been written, where C is an integer greater than or equal to 0 and represents the column number); (2) memwr_diag_matrix_no which indicates the matrix number for the last diagonal element written to memory; (3) memwr_col_no which indicates the current column number for the non-diagonal elements being written to memory (does not increment until all non-diagonals for a particular column C for all matrices have been written); (4) memwr_matrix_no which indicates the matrix number for the last non-diagonal element written to memory; and (5) memwr_ndiag_cnt which is a total count of the number of non-diagonal elements that have been written to memory.

In one embodiment, scheduler counters 131 include four counters. In one embodiment, the four counters keep track of the following: (1) sch_diag_col_no which indicates the column number of the next diagonal to process (does not increment until all diagonals for a particular column C for all matrices have been written); (2) sch_diag_matrix_no which indicates the matrix number of the next diagonal to process; (3) sch_ndiag_matrix_no which indicates the matrix number of the non-diagonal elements being processed or to be processed; and (4) sch_ndiag_col_no which indicates the column number of the non-diagonal elements being processed or to be processed.

In one embodiment, scheduler 130 uses one or more of the above counter values to determine whether data needed to calculate an element of the output matrix is available in memory 120. Further details regarding use of the above counter values is provided below.

As noted above, port A of memory 120 is shared amongst input I/F 105 writing data into memory 120 and PU 140 writing the output element into memory 120. In one embodiment, arbitration between input I/F 105 and PU 140 writing data into memory 120 is as follows. When new input is being written into memory 120, PU 140 cannot be doing any write operations to memory 120. Similarly, no new input data can be fed into memory 120 until PU 140 has written all output data to memory 120 and also until that output data has been read out of matrix decomposition circuit 100.

As also noted above, port B of memory 120 is shared amongst scheduler 130 and output I/F 145. In one embodiment, scheduler 130 and output I/F 145 cannot access memory 120 at the same time.

Matrix decomposition circuit 100 optimizes memory usage by using the same memory for input and output data. Also, it simplifies memory arbitration logic. It ensures a high throughput as scheduler 130 read operations on memory 120 are not stalled by any PU 140 write operations on memory 120 as they occur on different ports.

Figure 2:
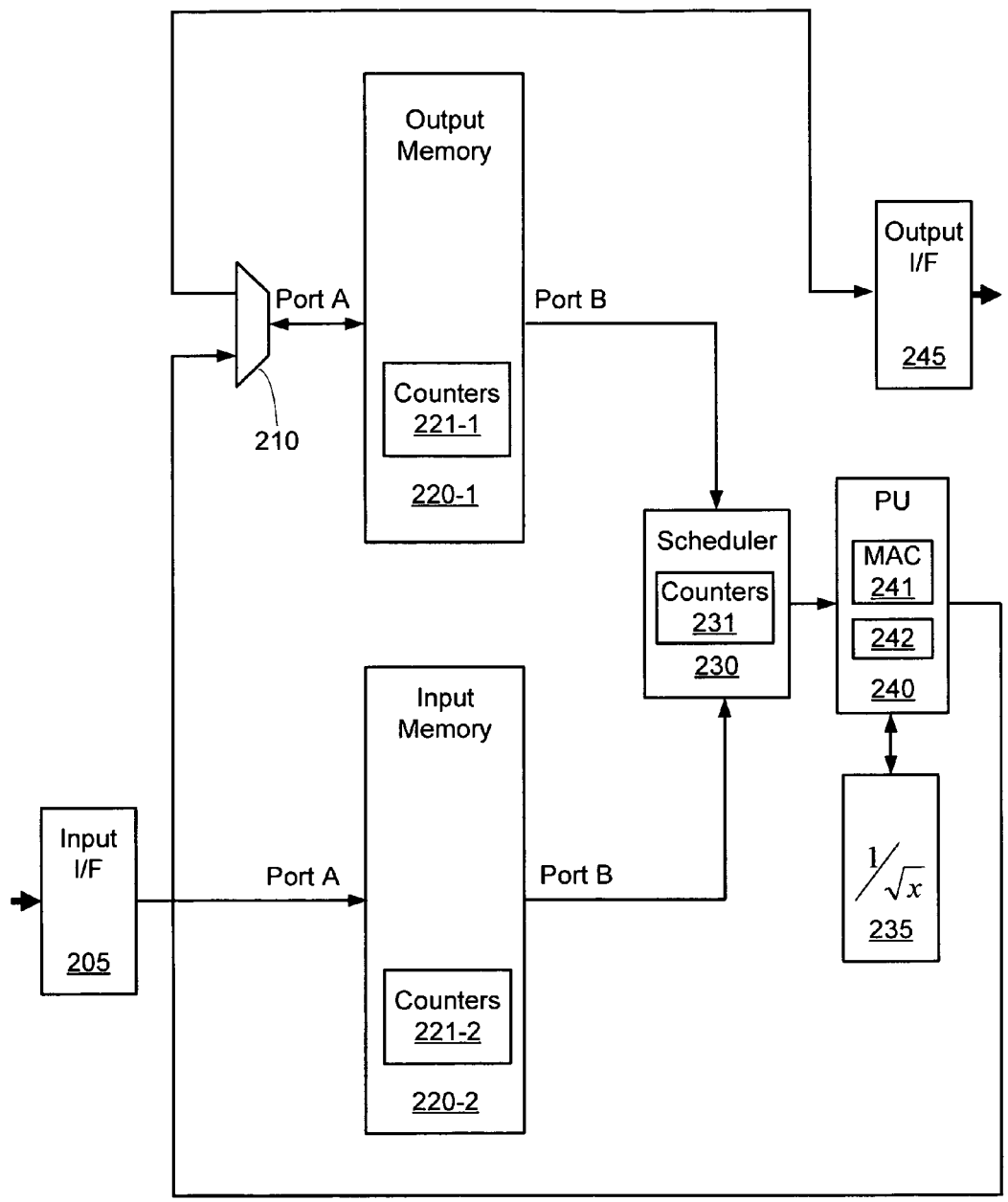
FIG. 2 is a block diagram of a second embodiment of the matrix decomposition circuit of the present invention.

FIG. 2 is a block diagram of a second embodiment of the matrix decomposition circuit of the present invention. In FIG. 2, matrix decomposition circuit 200, includes input I/F 205, multiplexer 210, memory 220-1, memory counters 221-1 associated with memory 220-1, memory 220-2, memory counters 221-2 associated with memory 220-2, scheduler 230 with scheduler counters 231, inverse square root unit 235, PU 240 with MAC 241 and buffers 242, and output I/F 245. Memories 220-1 and 220-2 are also herein respectively referred to as output memory 220-1 (or output memory block 220-1) and input memory 220-2 (or input memory block 220-2). For ease of illustration, memory counters 221-1 and 221-2 are shown as being part of memories 220-1 and 220-2, respectively. However, in one embodiment, memory counters 221-1 and 221-2 are not part of memories 220-1 and 220-2, respectively. Instead, memory counters 221-1 and 221-2 are simply coupled to memories 220-1 and 220-2, respectively.

With the exceptions noted below, matrix decomposition circuit 200 is similar to matrix decomposition circuit 100. Components and signals in matrix decomposition circuit 200 that serve similar functions as their counterparts in matrix decomposition circuit 100 have been designated with reference numbers that differ from those of their counterparts by one hundred. For example, scheduler 230, PU 240, and inverse square root unit 235 in matrix decomposition circuit 200 respectively correspond to scheduler 130, PU 140, and inverse square root unit 135 in matrix decomposition circuit 100. Also, where multiple components in matrix decomposition circuit 200 have a corresponding counterpart in matrix decomposition circuit 100, such components in matrix decomposition circuit 200 have been designated with reference numbers that are in two parts. The first part of such a reference number is the base reference number which appears before a hyphen and differs from that of its counterpart in matrix decomposition circuit 100 by one hundred. The second part of such a reference number which appears after a hyphen further identifies that component in matrix decomposition circuit 200. For example, memories 220-1 and 220-2 in matrix decomposition circuit 200 correspond to memory 220 in matrix decomposition circuit 100. The first part of reference numbers 220-1 and 220-2, i.e., "220", differs from the reference number 120 of memory 120 by one hundred. The second part of reference numbers 220-1 and 220-2, i.e., "1" and "2", further respectively identify memories 220-1 and 220-2 in matrix decomposition circuit 200. As matrix decomposition circuit 200 is similar to matrix decomposition circuit 100 and operates in a similar fashion, it will not be described in greater detail here, except to note some of its differences relative to matrix decomposition circuit 100.

One main difference between matrix decomposition circuits 100 and 200 is that matrix decomposition circuit 200 includes two memories, rather than one. More specifically, it includes output memory 220-1 and input memory 220-2. Input memory 220-2 stores elements of the input matrix, whereas output memory 220-1 stores elements of the output matrix and intermediate results or values, which are values, other than elements of the input matrix, that are used in the calculation of elements of the output matrix. Intermediate values that are intermediate results for calculations of output matrix elements may also herein be referred to as output matrix elements. The significance of the above difference between matrix decomposition circuits 100 and 200 is explained in more detail below.

Another difference between matrix decomposition circuits 100 and 200 is that matrix decomposition circuit 200 does not include a multiplexer or demultiplexer, such as demultiplexer 115 of matrix decomposition circuit 100, at port B of either output memory 220-1 or input memory 220-2. This is because in matrix decomposition circuit 200 only scheduler 230 accesses data via ports B of output memory 220-1 and input memory 220-2. As such, there is no need for a demultiplexer to select between scheduler 230 and some other element for the destination of data read via ports B of output memory 220-1 and input memory 220-2.

In one embodiment, matrix decomposition circuit 200 operates as follows. First, input data is read into input memory block 220-2 from input I/F 205 on port A and, simultaneously, output data from the previous run is read out of output memory block 220-1 on port A to the output I/F 245. Second, scheduler 230 reads data required for the current element of the output matrix being processed. This required data includes elements of the input matrix which it reads from port B of input memory block 220-2 and elements of the output matrix L (from previous iterations) which it reads simultaneously from port B of output memory block 220-1. As in matrix decomposition circuit 100, if PU 240 had completed in an earlier iteration its write of output data required in the current iteration to output memory 220-1, scheduler 230 is not likely to stall. If, on the other hand, output data of a previous iteration required for the current iteration is not available, scheduler 230 will stall.

In one embodiment, matrix decomposition circuit 200 offers higher performance than matrix decomposition circuit 100 because in matrix decomposition circuit 200 input data is read from input I/F 205 on port A of input memory block 220-2 at the same time as output data on port A of output memory block 220-1 is written to output I/F 245. However, this higher performance comes at a cost of double memory usage. Also, unlike scheduler 130, scheduler 230 has two input ports which enable it to read data from both output memory block 220-1 and input memory block 220-2 simultaneously. PU 240, however, can only read one input per cycle from scheduler 230. As a result, even though MAC 241 is fully pipelined for one complex MAC operation per cycle, in actual operation it performs one complex MAC every two cycles. PU 240 writes the result of its calculations, an element of the output matrix, to port A of output memory block 220-1, access to which is shared with output I/F 245 through multiplexer 210. Because access is shared, if PU 240 and output I/F 245 try to communicate with output memory block 220-1 during the same clock cycle, a stall will occur.

Figure 3:
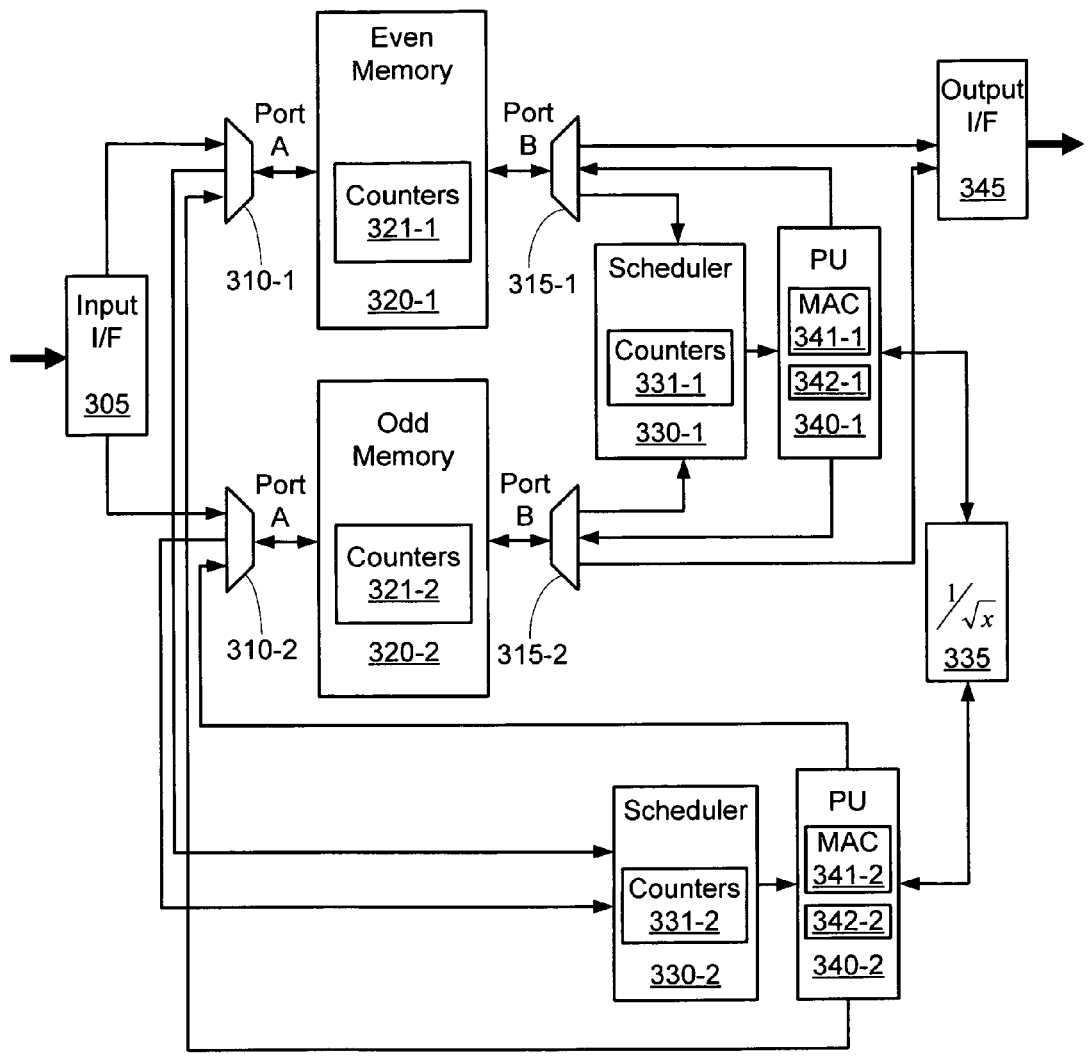
FIG. 3 is a block diagram of a third embodiment of the matrix decomposition circuit of the present invention.

FIG. 3 is a block diagram of a third embodiment of the matrix decomposition circuit of the present invention. In FIG. 3, matrix decomposition circuit 300 includes input I/F 305, multiplexer 310-1, multiplexer 310-2, multiplexer 315-1, multiplexer 315-2, memory 320-1, memory counters 321-1 associated with memory 320-1, memory 320-2, memory counters 321-2 associated with memory 320-2, scheduler 330-1 with scheduler counters 331-1, scheduler 330-2 with scheduler counters 331-2, PU 340-1 with MAC 341-1 and buffers 342-1, PU 340-2 with MAC 341-2 and buffers 342-2, inverse square root unit 335, and output I/F 345. Memories 320-1 and 320-2 are also herein respectively referred to as even memory 320-1 (or even memory block 320-1) and odd memory 320-2 (or odd memory block 320-2). For ease of illustration, memory counters 321-1 and 321-2 are shown as being part of memories 320-1 and 320-2, respectively. However, in one embodiment, memory counters 321-1 and 321-2 are not part of memories 320-1 and 320-2, respectively. Instead, memory counters 321-1 and 321-2 are simply coupled to memories 320-1 and 320-2, respectively.

With the exceptions noted below, matrix decomposition circuit 300 is similar to matrix decomposition circuit 100. Components and signals in matrix decomposition circuit 300 that serve similar functions as their counterparts in matrix decomposition circuit 100 have been designated with reference numbers that differ from those of their counterparts by two hundred. For example, input I/F 305 and inverse square root unit 335 in matrix decomposition circuit 300 respectively correspond to input I/F 105 and inverse square root unit 135 in matrix decomposition circuit 100. Also, where multiple components in matrix decomposition circuit 300 have a corresponding counterpart in matrix decomposition circuit 100, such components in matrix decomposition circuit 300 have been designated with reference numbers that are in two parts. Such components are numbered in a manner similar to that described above in reference to matrix decomposition circuit 200. As matrix decomposition circuit 300 is similar to matrix decomposition circuit 100 and operates in a similar fashion, it will not be described in greater detail here, except to note some of its differences relative to matrix decomposition circuit 100.

One main difference between matrix decomposition circuits 100 and 300 is that matrix decomposition circuit 300 includes two memories, rather than one. More specifically, it includes even memory 320-1 and odd memory 320-2. Even memory 320-1 stores elements of even numbered columns of both the input and output matrices, whereas odd memory 320-2 stores elements of odd numbered columns of both the input and output matrices. Even memory 320-1 and odd memory 320-2 also respectively store intermediate values used in the calculation of elements of even and odd numbered columns of the output matrix.

As used herein, even and odd columns refer to columns whose column numbers are even and odd, respectively, assuming that column numbering begins with 0, instead of 1. This is consistent with the way columns are generally numbered in hardware and software. Also, as used herein, when representing columns in mathematical form or referring to columns and elements of columns in such matrices, it is assumed that column numbering begins with 1, instead of 0. The above also applies to the naming and numbering of matrix rows. The below 6 by 6 matrix L is used to illustrate these different conventions:

$$L = \begin{pmatrix} \overset{E}{l_{11}} & \overset{O}{0} & \overset{E}{0} & \overset{O}{0} & \overset{E}{0} & \overset{O}{0} \\ l_{21} & l_{22} & 0 & 0 & 0 & 0 \\ l_{31} & l_{32} & l_{33} & 0 & 0 & 0 \\ l_{41} & l_{42} & l_{43} & l_{44} & 0 & 0 \\ l_{51} & l_{52} & l_{53} & l_{54} & l_{55} & 0 \\ l_{61} & l_{62} & l_{63} & l_{64} & l_{65} & l_{66} \end{pmatrix}$$

An E or O above a column indicates that the column is an even or odd column, respectively. As can be seen from matrix L and the even or odd designation above its columns, columns that are numbered 1, 3, and 5 for purposes of mathematical representation of the matrix and its elements (where column numbering starts with 1) are designated as even columns (where column numbering starts with 0). Similarly, columns that are numbered 2, 4, and 6 for purposes of mathematical representation of the matrix and its elements (where column numbering starts with 1) are designated as odd columns (where column numbering starts with 0).

Another difference between matrix decomposition circuits 100 and 300 relates to the number of schedulers and PUs in the two circuits. Whereas matrix decomposition circuit 100 includes one scheduler and one PU, matrix decomposition circuit 300 includes two schedulers and two PUs. Scheduler 330-1 reads from both even memory block 320-1 and odd memory block 320-2 via port B. On the other hand, scheduler 330-2 reads from both even memory block 320-1 and odd memory block 320-2 via port A. PU 340-1 writes data to both even memory block 320-1 and odd memory block 320-2 via port B. On the other hand, PU 340-2 writes data to both even memory block 320-1 and odd memory block 320-2 via port A. PU 340-1 receives data from scheduler 330-1, whereas PU 340-2 receives data from scheduler 330-2.

As both PUs 340-1 and 340-2 and both schedulers 330-1 and 330-2 have access to both memories 320-1 and 320-2, the two PU-scheduler pairs (i.e., the pair PU 340-1 and scheduler 330-1 and the pair PU 340-2 and scheduler 330-2) can operate simultaneously, provided the required data is available in memories 320-1 and 320-2. In one embodiment, PU 340-1 in conjunction with scheduler 330-1 and inverse square root unit 335 calculates elements in the even columns of the output matrix, whereas PU 340-2 in conjunction with scheduler 330-2 and inverse square root unit 335 calculates elements in the odd columns of the output matrix.

Also, unlike matrix decomposition circuit 100, matrix decomposition circuit 300 includes two sets of multiplexers, rather than one. More specifically, matrix decomposition circuit 300 includes multiplexers 310-1 and 315-1 associated with even memory 320-1 and multiplexers 310-2 and 315-2 associated with odd memory 320-2. Multiplexer 310-1 is a combination multiplexer-demultiplexer. It selects between signals received from input I/F 305 and PU 340-2 for providing to port A of even memory block 320-1. Multiplexer 310-1 also provides data read via port A of even memory block 320-1 to scheduler 330-2. Similarly, multiplexer 310-2 is a combination multiplexer-demultiplexer. It selects between signals received from input I/F 305 and PU 340-2 for providing to port A of odd memory block 320-2. Multiplexer 310-2 also provides data read via port A of odd memory block 320-2 to scheduler 330-2. Multiplexer 315-1 is also a combination multiplexer-demultiplexer. It receives data read via port B of even memory block 320-1 and sends it to either output I/F 345 or scheduler 330-1. Multiplexer 315-1 also receives data from PU 340-1 and provides that data to port B of even memory block 320-1. Similarly, multiplexer 315-2 is also a combination multiplexer-demultiplexer. It receives data read via port B of odd memory block 320-2 and sends it to either output I/F 345 or scheduler 330-1. Multiplexer 315-2 also receives data from PU 340-1 and provides that data to port B of odd memory block 320-2.

As can be seen in FIG. 3, access to port A of even memory block 320-1 is shared by input I/F 305 and PU 340-2, which write data via port A, and scheduler 330-2, which reads data via port A. Similarly, access to port A of odd memory block 320-2 is shared by input I/F 305 and PU 340-2, which write data via port A, and scheduler 330-2, which reads data via port A. In one embodiment, arbitration between input I/F 305 and PU 340-2 or scheduler 330-2 accessing port A of either even memory block 320-1 or odd memory block 320-2 is as follows. When input I/F 305 accesses a port A to write data to a memory block, then PU 340-2 or scheduler 330-2 is not allowed to access the same memory block via that port. As to arbitration between scheduler 330-2 reading from a memory block via port A and PU 340-2 writing to the same memory block via port A, in one embodiment, PU 340-2 writes to the memory block via port A when scheduler 330-2 is not reading from that same memory via port A. Such an arrangement provides a high throughput. This arbitration is described in greater detail below.

Similarly, access to port B of even memory block 320-1 is shared by output I/F 345 and scheduler 330-1, which read data via port B, and PU 340-1, which writes data via port B. Similarly, access to port B of odd memory block 320-2 is shared by output I/F 345 and scheduler 330-1, which read data via port B, and PU 340-1, which writes data via port B. Arbitration between output I/F 345 and PU 340-1 or scheduler 330-1 accessing port B of either even memory block 320-1 or odd memory block 320-2 is simple. In one embodiment, when output I/F 345 accesses a port B to read data from a memory block, then PU 340-1 or scheduler 330-1 are not allowed to access the same memory block via that port. As to arbitration between scheduler 330-1 reading from a memory block via port B and PU 340-1 writing to the same memory block via port B, in one embodiment, PU 340-1 writes to the memory block via port B when schedule 330-1 is not reading form that same memory via port B. Such an arrangement provides a high throughput. This arbitration is described in greater detail below.

It is to be noted that in one embodiment, access to memory block 320-1 is independent of access to memory block 320-2. Also, as each of memory blocks 320-1 and 320-2 is a dual port memory block, access to one port of the memory block is independent of access to the other port of the same memory block.

The operation of the matrix decomposition circuit 300 is as follows. Input I/F 305 receives input data and sends even and odd columns of the input matrix to even and odd memory blocks 320-1 and 320-2, respectively. In one embodiment, scheduler 330-1 and PU 340-1 process elements of column 1 (an even column) of the output matrix while scheduler 330-2 and PU 340-2 process elements of column 2 (an odd column) of the output matrix.

The diagonal element of the first column of the output matrix ($l_{11}$) is processed by PU 340-1 and stored in even memory block 320-1. The remaining elements of the first column of output matrix L are processed as soon as the diagonal element $l_{11}$ becomes available in memory. All of these values are stored in even memory block 330-1.

The processing of column 2 by matrix decomposition circuit 300 begins at the point where all the data required for the calculation of the diagonal element $l_{22}$ of the second column of the output matrix becomes available to scheduler 330-2. An advantage of the design of matrix decomposition circuit 300 is that scheduler 330-2 and PU 340-2 do not share physical access to the memory blocks on the same ports as scheduler 330-1 and PU 340-1. PU 340-2 can begin processing $l_{22}$ as soon as $l_{21}$ becomes available in memory. Assume PU 340-1 has written $l_{21}$ to memory and scheduler 330-1 is processing $l_{31}$. At this point, scheduler 330-2 starts processing $l_{22}$ (as it is dependent on $l_{21}$). Similarly, once PU 340-1 has written $l_{31}$ to memory, scheduler 330-2 starts processing $l_{32}$. Once PU 340-2 has written $l_{32}$ into memory, scheduler 330-1 starts processing $l_{33}$. The remaining elements are processed in similar order.

As both scheduler-PU pairs can process data simultaneously, they can effectively increase the throughput of the system to one complex MAC operation per cycle. This increased throughput is achieved at the cost of increased hardware resources, e.g., an additional scheduler and PU, and the complexity of having an additional scheduler and PU.

Matrix decomposition circuit 300 has only one inverse square root unit 335. Both PU components 340-1 and 340-2 access it at different times when calculating the diagonal element. Because the diagonal element of each succeeding column depends on non-diagonal values of the previous columns which in turn depend on their respective diagonal elements, there is no likelihood that two columns will access inverse square root unit 335 at the same time. In the case of multiple matrix decomposition the likelihood, although not zero, is low.

In other embodiments, additional scheduler and PU pairs can be added to matrix decomposition circuit 300. The additional scheduler and PU pairs can allow for increasing the number of columns processed in parallel. This parallelism is possible because an entire column of the output matrix does not have to be computed before work on the next column can begin. Each added scheduler and PU pair would begin scheduling and processing a column shortly after the previous scheduler and PU has begun its series of computations. Such a scheme would, however, increase the complexity of the arbitration scheme for accessing memory. The memory ports in this case would have to be arbitrated across multiple schedulers and PUs. In such a situation, each of the different schedulers sharing the same memory ports would do its reads at times when the other schedulers are accessing the other memory. This could also be the time when the writes from the PU would be scheduled to occur.

In another implementation, more memory blocks could be added to keep the ratio of memory blocks to the number of scheduler and PUs low enough to prevent read/write conflicts. By adding two additional memory blocks to matrix decomposition circuit 300, for example, each of four memory blocks would store elements of one column out of every 4 consecutive columns. This would free up bandwidth on each memory block to allow the other PU components to write to them and other schedulers to read from them. However, this adds complexity to the solution and could introduce programmable logic device (PLD) routing problems (all memory ports being arbitrated amongst all schedulers and PUs) to meet the clock speed requirements.

Figure 4:
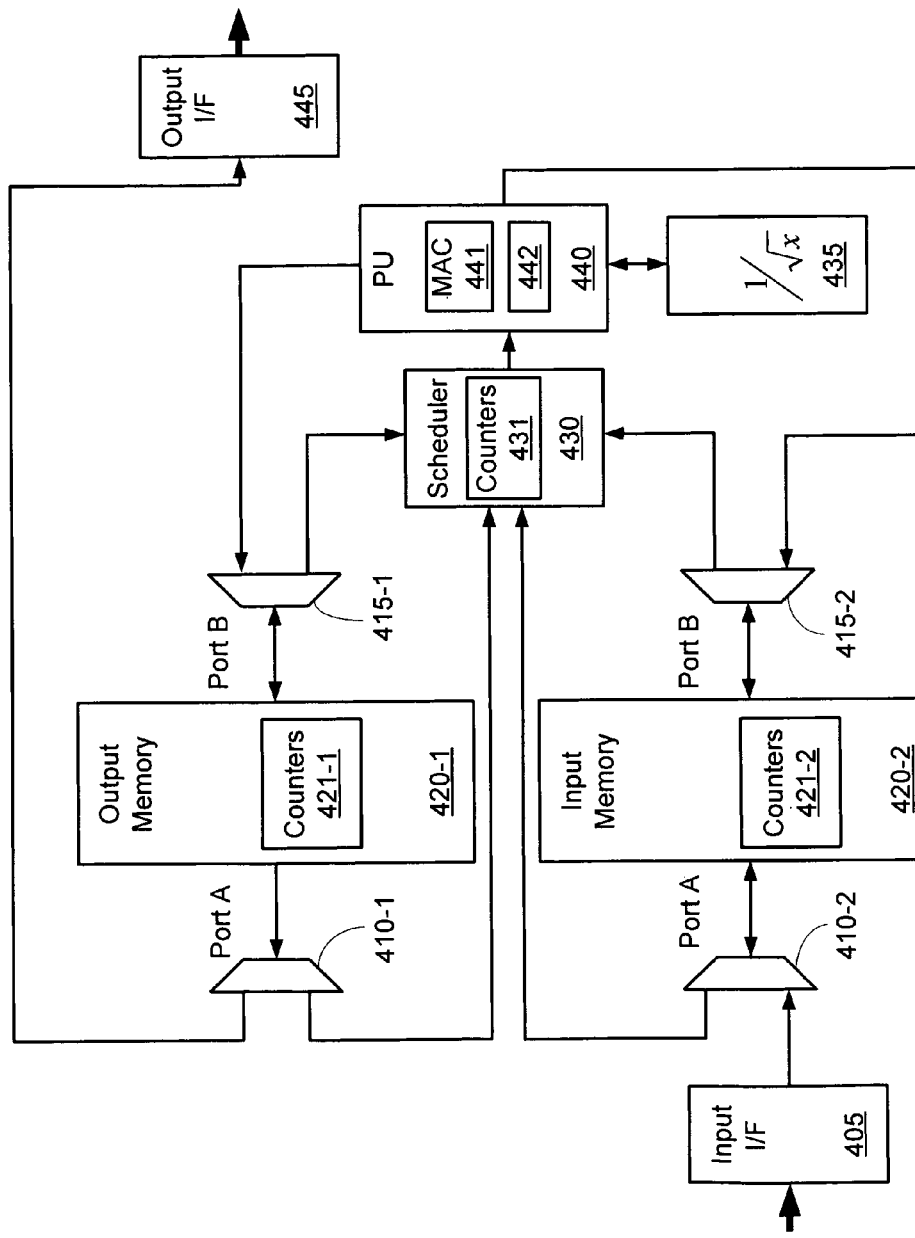
FIG. 4 is a block diagram of a fourth embodiment of the matrix decomposition circuit of the present invention.

FIG. 4 is a block diagram of a fourth embodiment of the matrix decomposition circuit of the present invention. In FIG. 4, matrix decomposition circuit 400 includes input I/F 405, multiplexer 410-1, multiplexer 410-2, multiplexer 415-1, multiplexer 415-2, memory 420-1, memory counters 421-1 associated with memory 420-1, memory 420-2, memory counters 421-2 associated with memory 420-2, scheduler 430 with scheduler counters 431, PU 440 with MAC 441 and buffers 442, inverse square root unit 435 and output I/F 445. Memories 420-1 and 420-2 may also herein respectively be referred to as output memory 420-1 (or output memory block 420-1) and input memory 420-2 (or input memory block 420-2). For ease of illustration, memory counters 421-1 and 421-2 are shown as being part of memories 420-1 and 420-2, respectively. However, in one embodiment, memory counters 421-1 and 421-2 are not part of memories 420-1 and 420-2, respectively. Instead, memory counters 421-1 and 421-2 are simply coupled to memories 420-1 and 420-2, respectively.

With the exceptions noted below, matrix decomposition circuit 400 is similar to matrix decomposition circuit 100. Components and signals in matrix decomposition circuit 400 that serve similar functions as their counterparts in matrix decomposition circuit 100 have been designated with reference numbers that differ from those of their counterparts by three hundred. For example, scheduler 430, PU 440, and inverse square root unit 435 in matrix decomposition circuit 400 respectively correspond to scheduler 130, PU 140, and inverse square root unit 135 in matrix decomposition circuit 100. Also, where multiple components in matrix decomposition circuit 400 have a corresponding counterpart in matrix decomposition circuit 100, such components in matrix decomposition circuit 400 have been designated with reference numbers that are in two parts. Such components are numbered in a manner similar to that described above in reference to matrix decomposition circuit 200. As matrix decomposition circuit 400 is similar to matrix decomposition circuit 100 and operates in a similar fashion, it will not be described in greater detail here, except to note some of its differences relative to matrix decomposition circuit 100.

One main difference between matrix decomposition circuits 100 and 400 is that matrix decomposition circuit 400 includes two memories, rather than one. More specifically, it includes output memory 420-1 and input memory 420-2. Input memory 420-2 stores elements of the input matrix and intermediate values, whereas output memory 420-1 stores elements of the output matrix and intermediate values.

Also, unlike matrix decomposition circuit 100, matrix decomposition circuit 400 includes two sets of multiplexers, rather than one. More specifically, matrix decomposition circuit 400 includes multiplexers 410-1 and 415-1 associated with output memory 420-1 and multiplexers 410-2 and 415-2 associated with input memory 420-2. Multiplexer 410-1 is in fact a demultiplexer. It receives data from output memory 420-1 via port A and selects between sending that data to scheduler 430 and output I/F 445. Each of multiplexer 410-2, 415-1 and 415-2 is a combination multiplexer-demultiplexer. Multiplexer 410-2 receives data from input I/F 405 and provides that data to input memory 420-2 via port A. It also receives data from input memory 420-2 via port A and provides that data to scheduler 430. Multiplexer 415-1 receives data from output memory 420-1 via port B and sends that data to scheduler 430. It also receives data from PU 440 and provides that data to output memory 420-1 via port B. Similarly, multiplexer 415-2 receives data read via port B of input memory 420-2 and sends that data to scheduler 430. It also receives data from PU 440 and provides that data to input memory 420-2 via port B.

As can be seen in FIG. 4, access to port A of output memory 420-1 is shared by scheduler 430 and output I/F 445. Data from port A of output memory 420-1 is sent to either scheduler 430 or output I/F 445.

Similarly, access to port A of input memory 420-2 is shared by input I/F 405, which writes data via port A, and scheduler 430, which reads data via port A. In one embodiment, arbitration between input I/F 405 and scheduler 430 accessing port A of input memory 420-2 is as follows. When input I/F 405 accesses port A to write data to input memory 420-2, then scheduler 430 is not allowed to access that port.

Similarly, access to port B of output memory 420-1 is shared by scheduler 430, which read data via port B, and PU 440, which writes data via port B. Similarly, access to port B of input memory 420-2 is shared by scheduler 430, which read data via port B, and PU 440, which writes data via port B. Arbitration between scheduler 430 and PU 440 accessing port B of either output memory 420-1 or input memory 420-2 is as follows. In one embodiment, when PU 440 accesses a port B to write data to a memory block, then scheduler 430 is not allowed to access the same memory block via that port. Instead, as scheduler 430 has access to both memories via port A, when PU accesses a memory via port B, scheduler 430 can access that same memory via port A.

It is to be noted that in one embodiment, access to output memory 420-1 is independent of access to input memory 420-2. Also, as each of output memory 420-1 and input memory 420-2 is a dual port memory block, access to one port of the memory block is independent of access to the other port of the same memory block.

Unlike scheduler 130, 230, or 330, scheduler 430 has four inputs, instead of two. This allows it to read from all four ports of output memory 420-1 and input memory 420-2. Similarly, unlike PU 140 or 240, PU 440 has two outputs and is therefore able to write to port B of both output memory 420-1 and input memory 420-2. The combination of these features allows matrix decomposition circuit 400 to perform one complex MAC per clock cycle as explained below.

In one embodiment, the operation of the matrix decomposition circuit 400 is as follows. Input data received via input I/F 405 is written into input memory 420-2 via port A, and, at the same time, output data is read out of output memory 420-1 via port A for outputting via output I/F 445. Scheduler 430 reads required data from input memory 420-2 via port A. Scheduler 430 also reads required output data from output memory 420-1 via both ports A and B. Scheduler 430 then sends this data to PU 440. Using this data, PU 440 calculates $(a_{ij}-\langle L'_i,L'_j\rangle)$. As noted above, $a_{ij}$ is an element of the input matrix and is read from input memory 420-2 via port A. As also noted above, $L'_i$ and $L'_j$ are column vectors of dimension $j-1$ whose components are the first $j-1$ elements in the $i^{th}$ and $j^{th}$ row respectively of output matrix L. These values are read from ports A and B of output memory 420-1.

PU 440 writes these intermediate values into input memory 420-2 via port B. Once the intermediate values for a column have all been calculated, scheduler 430 reads an intermediate value from input memory 420-2 via port A and the diagonal element value of the output matrix from input memory 420-2 via port B. Scheduler 430 sends these two values to PU 440, which multiplies these values with each other and writes the result of the multiplication to output memory 420-1 via port B. These steps are repeated for all non-diagonal elements of a column. Similarly, this procedure is repeated for each column.

As can be noted from the above description, matrix decomposition circuit 400 allows for reading two values, i.e., an intermediate value and the diagonal value, from memory in one clock cycle. This allows PU 440 to perform one complex MAC per clock cycle. Also, by storing the intermediate result of $(a_{ij}-\langle L'_i,L'_j\rangle)$ in input memory 420-2, matrix decomposition circuit 400 circumvents the issue of ensuring that PU 440 write operations occur at such times so as not to stall scheduler 430.

There is a cost of having to re-read the intermediate results from input memory 420-2 and then write them to output memory 420-1 (though these two tasks will be somewhat overlapped in time). Thus, the improvement in throughput over matrix decomposition circuit 100 is not necessarily double. In fact, for smaller matrices the throughput improvement may be far less than double. It is estimated that the increase in throughput for decomposing one thousand 4 by 4 matrices is approximately 15%. An additional drawback of matrix decomposition circuit 400 is the double memory requirement as separate memories are used for input and output data.

In another embodiment, matrix decomposition circuit 400 may be modified to have a combined memory instead of separate input and output memories. In such an embodiment, the PU would calculate a final result and send the final result to the memory for storage, instead of calculating and sending the intermediate result for storage in the input memory. In such a case, the scheduler will send all $\langle L'_i,L'_j\rangle$ pairs for an output element to the PU and thereafter it will read the input element $a_{ij}$ and the diagonal element from memory and send that data to the PU. In such an embodiment, the scheduler may be stalled to allow the PU to write its data into memory. Suitable design of an arbitration unit would ensure minimum disruption. One example of such suitable design includes giving priority to scheduler reads over PU writes while ensuring the ability to switch quickly (preferably within one clock cycle) from scheduler reads to PU writes.

Figure 5:
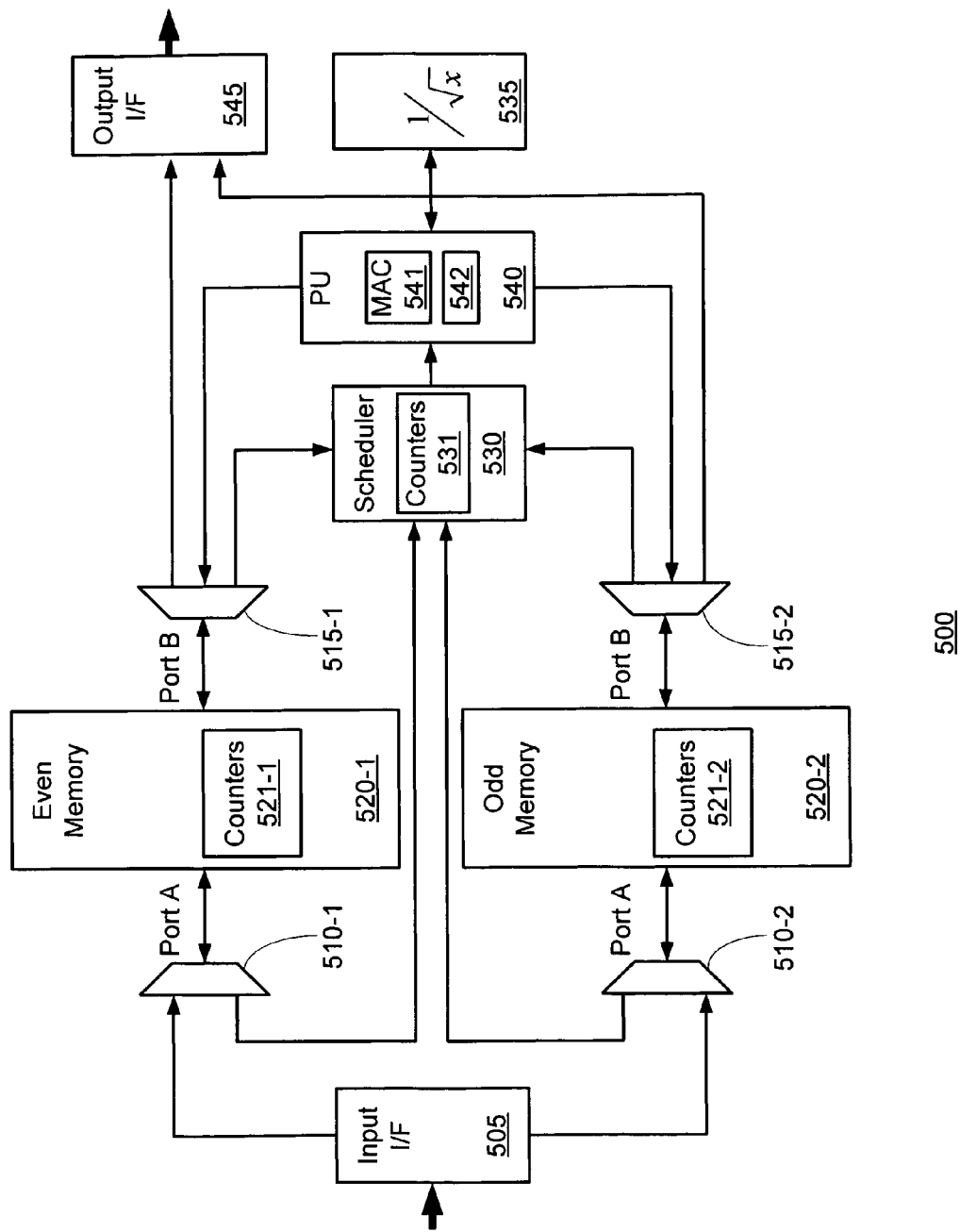
FIG. 5 is a block diagram of a fifth embodiment of the matrix decomposition circuit of the present invention.

FIG. 5 is a block diagram of a fifth embodiment of the matrix decomposition circuit of the present invention. In FIG. 5, matrix decomposition circuit 500 includes input I/F 505, multiplexer 510-1, multiplexer 510-2, multiplexer 515-1, multiplexer 515-2, memory 520-1, memory counters 521-1 associated with memory 520-1, memory 520-2, memory counters 521-2 associated with memory 520-2, scheduler 530 with scheduler counters 531, PU 540 with MAC 541 and buffers 542, inverse square root unit 535, and output I/F 545. Memories 520-1 and 520-2 may also herein respectively be referred to as even memory 520-1 (or even memory block 520-1) and odd memory 520-2 (or odd memory block 520-2). For ease of illustration, memory counters 521-1 and 521-2 are shown as being part of memories 520-1 and 520-2, respectively. However, in one embodiment, memory counters 521-1 and 521-2 are not part of memories 520-1 and 520-2, respectively. Instead, memory counters 521-1 and 521-2 are simply coupled to memories 520-1 and 520-2, respectively.

With the exceptions noted below, matrix decomposition circuit 500 is similar to matrix decomposition circuit 100. Components and signals in matrix decomposition circuit 500 that serve similar functions as their counterparts in matrix decomposition circuit 100 have been designated with reference numbers that differ from those of their counterparts by four hundred. For example, scheduler 530, PU 540, and inverse square root unit 535 in matrix decomposition circuit 500 respectively correspond to scheduler 130, PU 140, and inverse square root unit 135 in matrix decomposition circuit 100. Also, where multiple components in matrix decomposition circuit 500 have a corresponding counterpart in matrix decomposition circuit 100, such components in matrix decomposition circuit 500 have been designated with reference numbers that are in two parts. Such components are numbered in a manner similar to that described above in reference to matrix decomposition circuit 200. As matrix decomposition circuit 500 is similar to matrix decomposition circuit 100 and operates in a similar fashion, it will not be described in greater detail here, except to note some of its differences relative to matrix decomposition circuit 100.

One main difference between matrix decomposition circuits 100 and 500 is that matrix decomposition circuit 500 includes two memories, rather than one. More specifically, it includes even memory 520-1 and odd memory 520-2. Even memory 520-1 stores elements of even numbered columns of both the input and output matrices, whereas odd memory 520-2 stores elements of odd numbered columns of the input and output matrices. Even and odd numbered columns are as defined above in reference to matrix decomposition circuit 300 (shown in FIG. 3).

Also, unlike matrix decomposition circuit 100, matrix decomposition circuit 500 includes two sets of multiplexers, rather than one. More specifically, matrix decomposition circuit 500 includes multiplexers 510-1 and 515-1 associated with even memory 520-1 and multiplexers 510-2 and 515-2 associated with odd memory 520-2. Each of multiplexers 510-1, 510-2, 515-1, and 515-2 is a combination multiplexer-demultiplexer. Multiplexer 510-1 receives data from input I/F 505 and provides that data to even memory 520-1 via port A. Multiplexer 510-1 also receives data from even memory 520-1 via port A and provides that data to scheduler 530. Similarly, multiplexer 510-2 receives data from input I/F 505 and provides that data to odd memory 520-2 via port A. Multiplexer 510-2 also receives data from odd memory 520-2 via port A and provides that data to scheduler 530. Multiplexer 515-1 receives data from even memory 520-1 via port B and select between sending that data to scheduler 530 or output I/F 545. Multiplexer 515-1 also receives data from PU 540 and provides that data to even memory 520-1 via port B. Similarly, multiplexer 515-2 receives data read via port B of odd memory 520-2 and selects between sending that data to scheduler 530 or output I/F 545. Multiplexer 515-2 also receives data from PU 540 and provides that data to odd memory 520-2 via port B.

As can be seen in FIG. 5, access to port A of even memory 520-1 and port A of odd memory 520-2 is shared by input I/F 505, which writes data via port A, and scheduler 530, which reads data via port A. In one embodiment, arbitration between input I/F 505 and scheduler 530 accessing port A of even memory 520-1 or odd memory 520-2 is as follows. In one embodiment, input I/F 505 does not access the memory while decomposition is occurring. Therefore, during decomposition, scheduler 530 has priority over input I/F 505 in accessing port A. On the other hand, when input I/F 505 accesses a port A to write data to either even memory 520-2 or odd memory 520-1, then scheduler 530 is not allowed to access port A of the same memory.

Similarly, access to port B of even memory 520-1 is shared by scheduler 530 and output I/F 545, which read data via port B, and PU 540, which writes data via port B. Similarly, access to port B of odd memory 520-2 is shared by scheduler 530 and output I/F 545, which read data via port B, and PU 540, which writes data via port B. Arbitration between scheduler 530, output I/F 545 and PU 540 accessing port B of either output memory 520-1 or input memory 520-2 is as follows. In one embodiment, output I/F 545 does not access even memory 520-1 or odd memory 520-2 while decomposition is occurring. Therefore, while decomposition is occurring, arbitration between output I/F 545 and scheduler 530 or PU 540 accessing port B of even memory 520-1 or odd memory 520-2 is in favor of scheduler 530 or PU 540. On the other hand, while decomposition is not occurring, when output I/F 545 accesses a port B to read data from even memory 520-1 or odd memory 520-2, then scheduler 530 and PU 540 are not allowed to access the same memory via port B. Arbitration between scheduler 530 and PU 540 accessing port B of even memory 520-1 or odd memory 520-2 is as follows. In one embodiment, when PU 540 accesses a port B to write data to a memory block, then scheduler 530 is not allowed to access the same memory block via that port. Instead, as scheduler 530 has access to both memories via port A, when PU accesses a memory via port B, scheduler 530 can access that same memory via port A.

It is to be noted that in one embodiment, access to even memory 520-1 is independent of access to odd memory 520-2. Also, as each of even memory 520-1 and odd memory 520-2 is a dual port memory block, access to one port of the memory block is independent of access to the other port of the same memory block.

Like scheduler 430 (shown in FIG. 4), scheduler 530 has four inputs, instead of two. This allows it to read from all four ports of even memory 520-1 and odd memory 520-2. Similarly, like PU 440, PU 540 has two outputs and is therefore able to write to port B of both even memory 520-1 and odd memory 520-2.

As scheduler 530 has read access from both ports of both memories, it can read two words per clock cycle from each memory. This allows PU to perform one complex MAC per clock cycle. Thus, matrix decomposition circuit 500 is able to perform one complex MAC per clock cycle with a single PU as explained below. In matrix decomposition circuit 500, it should be possible to maintain this throughput as PU 540 writes to memory should not stall scheduler 530 from processing the next output element.

As can be seen in FIG. 5, PU 540 has write access to port B of both memory blocks. In matrix decomposition circuit 500, there will be times when scheduler 530 reads from only one of the two memory blocks. At those times, the other memory block is free to receive any write requests from PU 540. Also, when PU 540 accesses port B of a memory block to write data to that memory, scheduler 530 may access port A of that same memory block to read data from it. Thus, having two memory blocks (even memory block 520-1 and odd memory block 520-2), where each memory blocks has two ports and where the scheduler has access to both ports of both memory blocks and the PU has access to at least one port of each memory block, allows the PU to write data to memory without stalling the scheduler. In one embodiment, it is possible for most or all PU writes to occur without stalling the scheduler. This would enable maintaining the upper limit of performance of one complex MAC per clock cycle. This is explained in more detail below.

In one embodiment, scheduler 530 sends data to PU 540 on every clock cycle.

In another embodiment, more scheduler and PU pairs may be added to matrix decomposition circuit 500. Such addition would increase the performance of matrix decomposition circuit 500, but probably not linearly. In such an embodiment, each scheduler would preferably access a memory when no other scheduler or PU tries to access that memory. Otherwise, stalling may occur which may decrease the throughput of the matrix decomposition circuit. In one embodiment, to avoid such stalling, more memory blocks may be added to the matrix decomposition circuit. For example, memory blocks may be added such that each column of each group of four consecutive columns is stored in a different memory block. In other words, each memory block would store elements of every fourth column. In one embodiment, this would apply to columns of the both the input and output matrices.

In one embodiment, matrix decomposition circuit 500 may operate in single matrix decomposition mode or multiple matrix decomposition mode (which may also herein be referred to as parallel matrix decomposition mode). In single matrix decomposition mode, matrix decomposition circuit 500 entirely decomposes a single input matrix into an output matrix within a certain time period prior to proceeding to the decomposition of a next input matrix into an output matrix. In one embodiment, the size of a single matrix for decomposition may be around 32 by 32 or 80 by 80. It is to be noted that single matrix decomposition is not limited to decomposition of matrices of the above size, but applies to matrices of other sizes. Single matrix decomposition may be applied in a variety of different areas. One particular application for single matrix decomposition is in the area of joint detection in receivers. In multiple matrix decomposition, matrix decomposition circuit 500 decomposes M multiple input matrices (where M is an integer greater than 1 and represents the number of input matrices decomposed together as a batch) within a certain period of time prior to proceeding to a new batch of multiple input matrices for decomposition. In multiple matrix decomposition, before entirely decomposing one matrix of the M matrices, matrix decomposition circuit 500 decomposes part of at least one other matrix of the M matrices. In wireless applications where multiple matrix decomposition mode is prevalent, the matrix size tends to be small, around 2 by 2 or 4 by 4. For example, this is true in the area of multiple antenna schemes such as Mutiple-Input and Multiple-Output (MIMO) in Orthogonal Frequency Division Multiplexing (OFDM) systems. Similarly, each of matrix decomposition circuits 100, 200, 300, and 400, may operate in either single matrix decomposition mode or multiple matrix decomposition mode.

Below is a description of the order of processing elements of the output matrix by matrix decomposition circuit 500. A similar order may be used by other embodiments of the matrix decomposition circuit of the present invention.

To ensure a high throughput, it is desirable to avoid stalling the scheduler. Thus, it is desirable to avoid having the scheduler wait for an output element to be written by the PU in order for the scheduler to process the current element that the scheduler is processing. Therefore, when scheduling the processing order, the present invention takes into account the data dependencies of the output elements to other output elements and input elements.

Also, in one embodiment, the present invention schedules the calculation of output elements that will take the longest time to calculate to occur as soon as possible. More specifically, in one embodiment, this is done on a column by column basis. In other words, for each column of the output matrix, the present invention schedules the calculation of the element that will take the longest to calculate to occur as soon as possible. Generally, elements on the main diagonal will take the longest to calculate as they involve calculating the inverse square root, which in most common implementations involve the use of iterative techniques. Additionally, calculation of all the elements in a column C will require the diagonal element of column C. Similarly, none of the elements of the next column C+1 can be calculated until some of the elements of the previous column C are available. As a result, the calculations of diagonal elements are scheduled to occur as soon as possible. More specifically, the calculation of a diagonal element is scheduled to occur as soon as the output element(s) required for calculating the diagonal element are available in memory. It is to be noted that calculation of the first diagonal element, i.e., the diagonal element of the first column, requires only an element of the input matrix. In other words, its calculation does not require an output element. Thus, calculation of the first diagonal element is scheduled as soon as the input element required for calculating the first diagonal element is available in memory. Scheduling the processing of the diagonal element to occur as soon as possible ensures that when the scheduler comes to processing the first non-diagonal element in that column, the diagonal element value should either be available in memory (a best case scenario) or the scheduler will be stalled for the minimum amount of time until this value becomes available.

In one embodiment, in single matrix decomposition mode, to ensure high throughput, (1) all non-diagonal elements in the lowest numbered column of the output matrix are processed before moving on to the next non-diagonal elements in the next column of the output matrix and (2) diagonal elements of the output matrix are processed as soon as possible. The above processing order is described in more detail in reference to FIG. 6 below. In the single matrix decomposition mode, scheduling for processing and processing diagonal elements of the output matrix as soon as possible means scheduling for processing and processing those elements as soon as the output element(s) required for calculating the respective diagonal element is available in memory. Scheduling for processing and processing the first diagonal element of the output matrix as soon as possible means scheduling for processing and processing that diagonal element as soon as the required input element is available in memory.

In one embodiment, in multiple matrix decomposition mode the processing order is as follows. The matrix decomposition circuit processes diagonal elements of column 0 for all matrices M. Thereafter, the matrix decomposition circuit processes all non-diagonal elements in column C of a matrix m, where m is an integer that represents the number of a particular matrix in the M matrices and is greater than or equal to 0 and less than or equal to M, and where C and M are as defined above. Then if the diagonal element for column C (or column C+1 if all diagonal elements in column C for all M matrices have been processed) for any of M matrices, can be processed, it will be scheduled. Thereafter, the matrix decomposition circuit processes all non-diagonal elements in column C of a matrix m+1. (In other words, after scheduling the processing of an entire column of non-diagonal elements, the scheduler will interrogate memory to determine which diagonal elements can be scheduled. All the diagonal elements that can be scheduled will be scheduled. Thereafter, the scheduler moves onto scheduling the next column of non-diagonal elements.) Then again at this point, if a diagonal element for column C or C+1 for any of M matrices can be processed, it will be scheduled. This continues until column C of all matrices M has been processed. Thereafter the matrix decomposition circuit proceeds to process column C+1 (and diagonals for columns C+2). This continues until all columns of all matrices M have been processed. As indicated above, for each column, the diagonal element is scheduled for processing and processed as soon as possible. This is because the diagonal element has a high processing time and because the diagonal element is used for calculating the non-diagonal elements. In the multiple matrix decomposition mode, scheduling for processing and processing of diagonal elements as soon as possible means scheduling for processing and processing those elements as explained in this paragraph.

In one embodiment, the processing of all non-diagonal elements in a column for a matrix m is uninterrupted. This (1) allows further optimizations in the scheduler which helps maximize the memory bandwidth available for the PU to write data (which is described in further detail below) and (2) simplifies the design of the scheduler.

In one embodiment, the scheduler is capable of operating in both single matrix decomposition mode (which is typically used for decomposing a large matrix) and multiple matrix decomposition mode (which is typically used for decomposing many, small matrices).

In one embodiment, the matrix decomposition circuit of the present invention maximizes memory bandwidth available for PU writes. This optimization is described below in the context of matrix decomposition circuit 500. However, the optimization is not limited to matrix decomposition circuit 500, but it or similar optimizations can be applied to other matrix decomposition circuits where both the scheduler and PU access the memory via the same port. The objective is to control the PU writes to memory via a port to occur at times when the scheduler is not accessing the same memory via the same port. This increases the likelihood of not stalling the scheduler and, thus, also increases the likelihood that the scheduler will operate at the maximum throughput.

In one embodiment, the PU keeps copies of the following elements that were read from memory and sent to it by the scheduler: (1) the last diagonal element, (2) the last $l_{ij}$ read from port B of the even memory, and (3) the last $l_{ij}$ read from port B of the odd memory.

In one embodiment, in scheduling the next output element, the scheduler determines if it requires the diagonal element sent previously to the PU. If so, then the scheduler does not reread it from memory but merely indicates to the PU to use the last value. As the scheduler generic sequence is to process one column at a time, and all non-diagonal column elements, require the same diagonal value, this optimization should be useful.

Also, in scheduling the next output element, the scheduler determines if it requires the same $l_{ij}$ element read from port B of one of the memories that it sent previously to the PU. If so, then the scheduler does not reread it from memory but merely indicates to the PU to use the last value. The calculations of non-diagonal elements of the first and second columns (i.e., non-diagonal elements column 0 and 1 in software) that involve the complex multiplication $<L'_i, L'_j>$ uses the same $L'_j$ value read from the even memory. The above optimization is useful in such calculations. On the other hand, calculations of the third column (i.e., column 2 in software) onwards may not benefit from this optimization. However, as these calculations involve several complex multiplications with data pairs ping ponging amongst even and odd memories, there is always memory bandwidth available for PU writes.

Calculation of the diagonal element requires a multiplication of with the conjugate of itself. In one embodiment, rather than the scheduler reading the same value from both ports of the memory, it reads the value from only port A and signals to the PU to multiply this with the conjugate of itself.

In one embodiment, the above optimizations are performed in conjunction with the scheduler processing order described above. The above optimizations free up significant memory bandwidth on port B of the memories. FIGS. 6 and 7 below illustrate, by way of example, how this is achieved in the single matrix decomposition mode and multiple matrix decomposition mode, respectively.

FIG. 6 is a table illustrating the processing order in single matrix decomposition mode in an embodiment of the present invention. More specifically, FIG. 6 illustrates the processing order for the Cholesky decomposition of a 7 by 7 input matrix into a 7 by 7 output matrix using a matrix decomposition circuit of the present invention, such as matrix decomposition circuit 500 (shown in FIG. 5). A 7 by 7 output matrix L resulting from such decomposition is illustrated below, where E and O respectively indicate even and odd columns:

$$L = \begin{pmatrix} l_{11} & 0 & 0 & 0 & 0 & 0 & 0 \\ l_{21} & l_{22} & 0 & 0 & 0 & 0 & 0 \\ l_{31} & l_{32} & l_{33} & 0 & 0 & 0 & 0 \\ l_{41} & l_{42} & l_{43} & l_{44} & 0 & 0 & 0 \\ l_{51} & l_{52} & l_{53} & l_{54} & l_{55} & 0 & 0 \\ l_{61} & l_{62} & l_{63} & l_{64} & l_{65} & l_{66} & 0 \\ l_{71} & l_{72} & l_{73} & l_{74} & l_{75} & l_{76} & l_{77} \end{pmatrix}$$

$$\begin{array}{ccccccc} E & O & E & O & E & O & E \end{array}$$

In FIG. 6, table 600 includes columns 610, 611, 612, 620, 621, 622, 630, 631, 632, and 640. Column 610 is the scheduling element column and includes columns 611 and 612, which are respectively the column number and output element columns. In other words, the data in column 611 indicates the column number of the output element being processed by the scheduler, whereas column 612 indicates the output element being processed by the scheduler. As can be noted from table 600, column numbers start from 0. Column 620 is the even memory reads column and includes columns 621 and 622, which are respectively the port A and port B columns for the even memory reads. In other words, column 621 indicates what data is read via port A of the even memory, whereas column 622 indicates what data is read via port B of the even memory. Column 630 is the odd memory reads column and includes columns 631 and 632, which are respectively the port A and port B columns for the odd memory reads. In other words, column 631 indicates what data is read via port A of the odd memory, whereas column 632 indicates what data is read via port B of the odd memory. Column 640 indicates special instructions to the PU.

As can be seen from table 600, the processing of output elements by the scheduler starts with element $l_{11}$ and ends with element $l_{77}$. Also, all non-diagonal elements in the lowest numbered column are processed before processing non-diagonal elements of the next column. In fact, all elements in the lowest numbered column are processed before processing non-diagonal elements of the next column since, for each column, the diagonal element is the first element processed. For example, all elements of column 0 (i.e., elements $l_{11}$, $l_{21}$, $l_{31}$, $l_{41}$, $l_{51}$, $l_{61}$, and $l_{71}$) are processed before processing non-diagonal elements of column 1. Additionally, diagonal elements are scheduled to be processed as soon as possible. Thus, for example, the diagonal element of column 1, element $l_{22}$, is scheduled to be processed as soon as the last output element needed for calculating the diagonal element, i.e., $l_{21}$, is written into memory. More specifically, element $l_{22}$ is scheduled to be processed as soon as the scheduler detects that the PU has written element $l_{21}$ to the memory. It is to be noted that the processing of diagonal element $l_{22}$ is not scheduled to occur immediately after the processing of element $l_{21}$ because it takes some time for element $l_{21}$ to be processed and the result to be written to memory. In the example of table 600, element $l_{21}$ is not written to memory until after element $l_{41}$ is scheduled for processing. As a result, diagonal element $l_{22}$ is scheduled to be processed after element $l_{41}$. Similarly, diagonal element $l_{33}$ is scheduled for processing as soon as the scheduler detects that the PU has written element $l_{32}$ to memory.

As noted above, columns 621 and 622 indicate reads via ports A and B, respectively, of the even memory. Similarly, columns 631 and 632 indicate reads via ports A and B, respectively, of the odd memory. For example, for processing element $l_{32}$, columns 621 and 622 respectively indicate that elements $l_{31}$ and $l_{21}$ are read via ports A and B, respectively, of the even memory. Also, for processing the same element, columns 631 and 632 respectively indicate that elements $a_{32}$ and $l_{22}$ are read via ports A and B, respectively, of the odd memory.

Empty slots in columns 621, 622, 631, and 632 indicate that the respective ports of the respective memories are available for a read or write. As discussed above, in matrix decomposition circuit 500, the PU writes to the even and odd memories via ports B. Therefore, empty slots in columns 622 and 632 indicate that ports B of the even and odd memories, respectively, are available for PU writes. As can be seen in table 600, there are many available slots on ports B, which can be used for PU writes. In fact, there are more than 40 such available slots. This is more than enough for the 28 elements of the output matrix, i.e., the non-zero elements $l_{11}$ to $l_{77}$, that are processed by the PU and writing back to memory. Therefore, there is plentiful bandwidth for the PU to write output elements to memory. As a result, it is possible to ensure all PU writes occur without stalling the scheduler. As such, in table 600, it is assumed that the scheduler is never stalled and can, therefore, process elements at the maximum rate, i.e., the maximum rate without stalls.

In one embodiment, the empty slots on ports B that are not used for PU writes to memory, may be used to read data out to the output I/F. Similarly, in one embodiment, the empty slots on ports A may be used to write data to memory from the input I/F.

As also noted above, column 640 indicates special instructions to the PU. These special instructions include optimizations used by the PU. Such optimizations result in freeing up memory bandwidth as they reduce memory access. For example, for processing element $l_{31}$, the special instruction to the PU indicates that it should use the stored diagonal $l_{11}$. In other words, it indicates to the PU to use the value of $l_{11}$ that the PU stored in its internal buffer. This is instead of having the value $l_{11}$ read from even memory, which in one embodiment, would occupy port B of the even memory. It is to be noted that this frees up not only the memory bandwidth, but also the scheduler to the PU transmission. Another example of a special instruction is for the processing of element $l_{22}$, where the PU is instructed to use the conjugate of $l_{21}$.

Empty slots in columns 611 and 612 indicate that no new element is scheduled for processing during that cycle. This is because an additional cycle or cycles are needed (1) for reading the necessary data to process the previous element or (2) for processing the previous element or elements even after all the necessary data have been read. For example, on row 651, elements $a_{43}$, $l_{33}$, $l_{42}$, and $l_{32}$ need to be read before the processing of the current element $l_{43}$ can be completed. As a result, the slots on columns 611 and 612 are empty on row 651.

It is to be noted that in the example of table 600, it is assumed that the processing latency of the PU and routing of inputs into and outputs from the PU are not on the critical path. In other words, it is assumed that all the output elements required to calculate the next output element are always available.

FIG. 7 is a table illustrating the processing order in multiple matrix decomposition mode in an embodiment of the present invention. More specifically, FIG. 7 illustrates the processing order for the Cholesky decomposition of M 4 by 4 input matrices into M 4 by 4 output matrices using a matrix decomposition circuit of the present invention, such as matrix decomposition circuit 500 (shown in FIG. 5). A 4 by 4 output matrix L resulting from such decomposition is illustrated below, where E and O respectively indicate even and odd columns:

$$L = \begin{pmatrix} E & O & E & O \\ l_{11} & 0 & 0 & 0 \\ l_{21} & l_{22} & 0 & 0 \\ l_{31} & l_{32} & l_{33} & 0 \\ l_{41} & l_{42} & l_{43} & l_{44} \end{pmatrix}$$

In FIG. 7, table 700 includes columns 710, 711, 712, 720, 721, 722, 730, 731, 732, and 740. Column 710 is the scheduling element column and includes columns 711 and 712, which are respectively the matrix number and output element columns. In other words, the data in column 711 indicates the matrix number of the output element being processed by the scheduler, whereas column 712 indicates the output element being processed by the scheduler. Column 720 is the even memory reads column and includes columns 721 and 722, which are respectively the port A and port B columns for the even memory reads. In other words, column 721 indicates what data is read via port A of the even memory, whereas column 722 indicates what data is read via port B of the even memory. Column 730 is the odd memory reads column and includes columns 731 and 732, which are respectively the port A and port B columns for the odd memory reads. In other words, column 731 indicates what data is read via port A of the odd memory, whereas column 732 indicates what data is read via port B of the odd memory. Column 740 indicates special instructions to the PU.

With the exceptions noted below, table 700 is similar to table 600. Columns in table 700 that indicate similar information as their counterparts in table 600 have been designated with reference numbers that differ from those of their counterparts by one hundred. For example, columns 720, 730, and 740 in table 700 respectively correspond to columns 620, 630, and 640 in table 600. As table 700 is similar to table 600, it will not be described in greater detail here, except to note some of its differences relative to table 600.

One main difference between table 700 and 600 is the following. Table 700, as indicated above, represents an example of multiple matrix decomposition where M matrices each of which is a 4 by 4 matrix are decomposed. On the other hand, table 600 represents an example of single matrix decomposition of a 7 by 7 matrix. As a result, in table 700, column 711 indicates the matrix number of the output element that is being processed by the scheduler, whereas, in table 600, column 611 indicates the column number of the output element that is being processed by the scheduler. Also, in table 700, a row with ellipses, such as row 755, represents a number of rows that are not shown in the table. For example, row 755 represents the rows for processing output element $l_{11}$ of output matrices 3 to M−1. Row 756 represents the rows for processing output elements $l_{21}$, $l_{31}$, $l_{41}$, and $l_{22}$ of output matrices 2 to M−1. Row 757 represents the rows for processing output elements $l_{32}$, $l_{42}$, and $l_{33}$ of output matrices 2 to M−1. Row 758 represents possible rows for scheduling output elements $l_{33}$ for matrices other than matrix M in case those elements could not be scheduled during row 757 due to system latency or some other factors. Row 759 represents a row for processing output element $l_{44}$ of output matrix 3 and rows for processing output elements $l_{43}$ and $l_{44}$ of output matrices 4 to M−1.

Also, in table 700, the processing of output elements by the scheduler starts with element $l_{11}$ of matrix 0 and ends with element $l_{44}$ of matrix M. Additionally, in table 700, the processing order is that described above for multiple matrix decomposition mode, rather than the one for single matrix decomposition mode used in table 600.

As can be seen in table 700, there are a reasonable number of empty slots on ports B of the even and odd memories that can be used for PU writes. However, in some cases, it may not be possible to prevent the scheduler from stalling. As can be seen in table 700, when processing output element $l_{43}$ of column 2 (an even column), there is no bandwidth available on port B of the even memory for the PU to write a result to memory. In one embodiment, the scheduler would continue to process output element $l_{43}$ for the other matrices. As a result, there would continue to be no bandwidth for the PU to write output element $l_{43}$ to the even memory. In one embodiment, depending on the internal buffer depth in the PU, at some point, the PU will apply backpressure to the scheduler, effectively stalling it. This would enable the PU writes to get write bandwidth to write output elements $l_{43}$ to the even memory. In one embodiment, the scheduler should only be stalled when processing column 2, more specifically output element $l_{43}$, thus minimizing the stall time.

It is to be noted that in the example of table 700, as was the case in the example of table 600, it is assumed that the processing latency of the PU and routing of inputs into and outputs from the PU are not on the critical path. In other words, it is assumed that all the output elements required to calculate the next output element are always available.

In one embodiment, implementing the matrix decomposition circuits of the present invention described above involves performing the following tasks: (1) determining if the current column diagonal has been processed by scheduler; (2) determining if all the elements required to calculate the next diagonal are available; (3) determining if all the elements required to calculate the next non-diagonal element are available; and (4) generating memory addresses for all elements required for the computation of a particular output element. More specifically, in one embodiment, implementing the schedulers described above involves performing the above tasks. In one embodiment, the above tasks are performed in a manner that lends itself to simple PLD implementation. Below is a description of techniques for implementing the above, tasks in the context of matrix decomposition circuit 500 (shown in FIG. 5). These techniques can easily be modified to apply to the other embodiments of the matrix decomposition circuit of the present invention. Also, these techniques apply to both application areas of single and multiple matrix decompositions. In the case of single matrix multiplication, the matrix number M would be 0.

Figure 8:
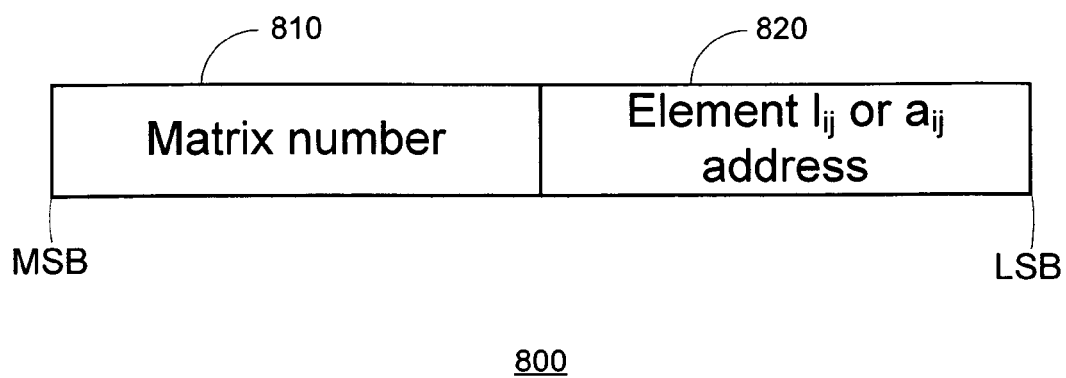
FIG. 8 illustrates one embodiment of the format of an element address.

FIG. 8 illustrates one embodiment of the memory addressing scheme employed by matrix decomposition circuits of the present invention. In FIG. 8, memory address 800 includes matrix number 810 and element address 820. Matrix number 810 includes the most significant bit (MSB) of memory address 800 and represents the number of the matrix being decomposed by the matrix decomposition circuit. More specifically, it represents the number of the matrix whose element is addressed by memory address 800. Again, as in the case of the numbering of rows and columns in software and hardware, the numbering of matrices in software and hardware begins at 0. Matrix number 810, therefore, holds the same value as column 711 of table 700 (shown in FIG. 7). For single matrix decomposition this portion of the address would always equal zero. Element address 820 includes the least significant bit (LSB) of memory address 800 and represents the address of a matrix element. Element address 820 may represent the address of an input matrix element $a_{ij}$ or an output matrix element $l_{ij}$. It is unlikely that the number of matrix elements in a single matrix, particularly in the case of multiple matrix decomposition, would utilize all the address spaces available for element addresses. Therefore, at least for multiple matrix decompositions, it is likely that there would be unused memory address locations. The simplicity (in terms of both logic and verification time) of this addressing scheme, however, outweighs having a more complicated addressing scheme where there is minimum waste of memory.

As noted above, in one embodiment, each memory includes counters for tracking write operations made to it. As also noted above, the counters keep track of the following: (1) memwr_diag_col_no; (2) memwr_diag_matrix_no; (3) memwr_col_no; (4) memwr_matrix_no; and (5) memwr_ndiag_cnt. It is to be noted that in a matrix decomposition circuit that includes multiple memory blocks, e.g., matrix decomposition circuit 500 (which includes even memory block 520-1 and odd memory block 520-2), each memory block has its own set of the above counter values. For example, in matrix decomposition circuit 500, memory counters 521-1 associated with even memory 520-1 keep track of the following values (1) even_memwr_diag_col_no; (2) even_memwr_diag_matrix_no; (3) even_memwr_col_no; (4) even_memwr_matrix_no; and (5) even_memwr_ndiag_cnt, which respectively correspond to the above five memory values. Similarly, memory counters 521-2 associated with odd memory 520-2 keep track of the following values (1) odd_memwr_diag_col_no; (2) odd_memwr_diag_matrix_no; (3) odd_memwr_col_no; (4) odd_memwr_matrix_no; and (5) odd_memwr_ndiag_cnt, which respectively correspond to the above five memory values.

Also in one embodiment, scheduler 530 includes scheduler counters 531. In one embodiment, scheduler counters 531 include four counters. As also noted above, in one embodiment, each scheduler includes counters for keeping track of the following: (1) sch_diag_col_no; (2) sch_diag_matrix_no; (3) sch_ndiag_matrix_no; and (4) sch_ndiag_col_no. It is to be noted that in a matrix decomposition circuit that includes multiple schedulers, e.g., matrix decomposition circuit 300 (shown in FIG. 3) (which includes schedulers 330-1 and 330-2), each scheduler has its own set of the above counter values.

In one embodiment, scheduler 530 uses one or more of the above counter values to determine whether data needed to calculate an element of the output matrix is available in memory 520-1 or 520-2. More specifically, in one embodiment, scheduler 530 uses one or more of the above values stored in memory counters 521-1 or 521-2 and/or one or more of the above values stored in scheduler counters 531 to determine whether data needed to calculate an element of the output matrix is available in memory 520-1 or 520-2. In one embodiment, scheduler 530 uses the counter values to determine if an output element has been written back to memory by PU 540. Among other things, this allows, scheduler 530 to schedule processing of output elements without knowledge of how long it takes PU 540 to calculate elements of the output matrix and write the results to memory 520-1 or 520-2. In one embodiment, scheduler 530 schedules an output element for processing only if the data needed to calculate the output element is available in memory. In one embodiment, scheduler 530 is capable of interrogating memory counters 521-1 or 521-2 and scheduler counters 531 every clock cycle to determine whether the needed data is available in memory. Also, in one embodiment, this helps allow scheduler 530 to schedule a new transaction, e.g., the processing of an output element, every clock cycle. It is to be noted that this feature is not limited to matrix decomposition circuit 500, as other matrix decomposition circuits of the present invention also include this feature. Below is further detail regarding use of the above counter values.

The below 8 by 8 output matrix and the description that follows provides an example of the use of some of the above counters and memory address values. In the below, E and O respectively indicate even and odd columns of the 8 by 8 output matrix L:

$$L = \begin{pmatrix} l_{11} & 0 & 0 & 0 & 0 & 0 & 0 & 0 \\ l_{21} & l_{22} & 0 & 0 & 0 & 0 & 0 & 0 \\ l_{31} & l_{32} & l_{33} & 0 & 0 & 0 & 0 & 0 \\ l_{41} & l_{42} & l_{43} & l_{44} & 0 & 0 & 0 & 0 \\ l_{51} & l_{52} & l_{53} & l_{54} & l_{55} & 0 & 0 & 0 \\ l_{61} & l_{62} & l_{63} & l_{64} & l_{65} & l_{66} & 0 & 0 \\ l_{71} & l_{72} & l_{73} & l_{74} & l_{75} & l_{76} & l_{77} & 0 \\ l_{81} & l_{82} & l_{83} & l_{84} & l_{85} & l_{86} & l_{87} & l_{88} \end{pmatrix}$$

$$\begin{matrix} E & O & E & O & E & O & E & O \end{matrix}$$

The even memory contents and counter values for the above matrix are as follows:

$l_{11}(0)/0/$ $l_{21}(1) < 1 >$ $l_{31}(2) < 2 > \quad l_{33}(8)/2/$ $l_{41}(3) < 3 > \quad l_{43}(9) < 8 >$ $l_{51}(4) < 4 > \quad l_{53}(10) < 9 > \quad l_{55}(14)/4/$ $l_{61}(5) < 5 > \quad l_{63}(11) < 10 > \quad l_{65}(15) < 13 >$ $l_{71}(6) < 6 > \quad l_{73}(12) < 11 > \quad l_{75}(16) < 14 > \quad l_{77}(18)/6/$ $l_{81}(7) < 7 > \quad l_{83}(13) < 12 > \quad l_{85}(17) < 15 > \quad l_{87}(19) < 16 >$ $\{0\} \qquad \{2\} \qquad \{4\} \qquad \{6\}$ In the above, the number in ( ) e.g., 3 for element $l_{41}$, represents the element address in even memory (which is represented by the variable element_addr in some of the below pseudo code); the number in //, e.g., 2 for element $l_{33}$, represents the memwr_diag_col_no; the number in < >, e.g., 11 for element $l_{73}$, represents memwr_ndiag_cnt; and the number in { }, e.g., 0 for column 0 (which includes elements $l_{11}$ to $l_{81}$), represents the memwr_col_no. It is to be noted that memwr_diag_col_no applies to only diagonal elements, whereas memwr_ndiag_cnt applies only to non-diagonal elements.

The odd memory contents and counter values for the above matrix are as follows:

$l_{22}(0)/1/$ $l_{32}(1) < 1 >$ $l_{42}(2) < 2 > \quad l_{44}(7)/3/$ $l_{52}(3) < 3 > \quad l_{54}(8) < 7 >$ $l_{62}(4) < 4 > \quad l_{64}(9) < 8 > \quad l_{66}(12)/5/$ $l_{72}(5) < 5 > \quad l_{74}(10) < 9 > \quad l_{65}(13) < 11 >$ $l_{82}(6) < 6 > \quad l_{84}(11) < 10 > \quad l_{75}(14) < 12 > \quad l_{88}(15)/7/$ $\{1\} \qquad \{3\} \qquad \{5\} \qquad \{7\}$ In the above, the number in ( ) e.g., 3 for element $l_{52}$, represents the element address in odd memory (which is represented by the variable element_addr in some of the below pseudo code); the number in //, e.g., 3 for element $l_{44}$, represents the memwr_diag_col_no; the number in < >, e.g., 11 for element $l_{65}$, represents memwr_ndiag_cnt; and the number in { }, e.g., 1 for column 1 which includes $l_{22}$ to $l_{82}$, represents the memwr_col_no.

Below is a description of one embodiment of a method of determining memory address values for elements of the output matrix or matrices.

The calculation of the inner product $\langle L'_i, L'_j \rangle$ requires various elements from even and odd memories 520-1 and 520-2. For example, to calculate $l_{87}$, the $L'_i$ elements required are: $l_{81}$ (whose memory address is 7 and is stored in even memory 520-1), $l_{82}$ (whose memory address is 6 and is stored in odd memory 520-2), $l_{83}$ (whose memory address is 13 and is stored in even memory 520-1), $l_{84}$ (whose memory address is 11 and is stored in odd memory 520-2), $l_{85}$ (whose memory address is 17 and is stored in even memory 520-1), $l_{86}$ (whose memory address is 14 and is stored in odd memory 520-2). The $L'_j$ elements required for calculating $l_{87}$ are $l_{71}$ to $l_{76}$.

In order to access the correct memory location, the address of each of the required elements must be generated. As can be noticed from the memory addresses of the above elements as well as the memory addresses of the other elements shown above, the memory addresses follow a pattern. More specifically, each even memory address is a simple function of the previous even memory address. Similarly, each odd memory address is a simple function of the previous odd memory address. In one embodiment, for both even and odd memory addresses, the scheduler generates addresses for elements starting from the lowest number columns. For even memory addresses, the scheduler generates addresses starting from column 0, whereas for odd memory addresses, the scheduler generates addresses starting from column 1.

For even memory addresses, the following equations are used to calculate $L'_i$ element addresses:

$l_{ij\_even}$=previous_$l_{ij\_even}$+even_increment, where even_increment=previous_even_increment−2, and where the initial value for even_increment is (n−2) and the initial value for $l_{ij\_even}$ is the row number of the matrix processing (i.e., the value of i in $l_{ij\_even}$).

For odd memory addresses, the following equations are used to calculate $L'_j$ element addresses:

$$l_{ij\_odd} = \text{previous}\_l_{ij\_odd} + \text{odd\_increment},$$

where odd_increment=previous_odd_increment−2, and where the initial value for odd_increment is (n−3) and the initial value for $l_{ij\_odd}$ is the row number of the matrix processed (i.e., the value of i in $l_{ij\_odd}$) minus 1.

The $L'_j$ element values for even and odd memory elements are calculated using the same formulas for even and odd memory elements, respectively, provided above. However, for $L'_j$ elements, the initial values for $l_{ij\_odd}$ and $l_{ij\_even}$ are the column number of the matrix being processed (i.e., the value of j in $l_{ij\_odd}$ and $l_{ij\_even}$, respectively).

In one embodiment, the scheduler determines if it has processed the current column's diagonal element before it attempts to process any elements in the current column. The following pseudo code describes an embodiment of a method for scheduler 530 to determine if it has processed the diagonal element of the column of the output matrix currently being processed before it attempts to process any non-diagonal elements belonging to the same column:

IF (sch_diag_col_no>sch_ndiag_col_no) THEN
  Current column diagonal has already been scheduled
ELSIF (sch_diag_matrix_no>sch_ndiag_matrix_no) THEN
  Current column diagonal for matrix being processed has already been scheduled
ELSE
  Current column diagonal has NOT been scheduled
END IF In the above method, if sch_diag_col_no is greater than sch_ndiag_col_no, then scheduler 530 determines that the current column diagonal has already been scheduled. Similarly, if sch_diag_matrix_no is greater than sch_ndiag_matrix_no, then scheduler 530 determines that the current diagonal for the matrix being processed has already been scheduled. If neither of the above conditions is met, then scheduler 530 determines that the current column diagonal has not been scheduled for processing.

Below is a description of one embodiment of the method of determining whether a diagonal element can be processed in a single matrix decomposition context. More specifically, it is a description of one embodiment of the method of determining if all matrix elements required for calculating the diagonal element are available in memory. In one embodiment, before scheduler 530 processes a diagonal element, it determines if all matrix elements required for calculating the diagonal element are available in memory. The description is provided in the context of the decomposition of an 8 by 8 input matrix resulting in an 8 by 8 output matrix such as the 8 by 8 matrix L shown above. Those skilled in the art would recognize that the method described below applies to other matrix sizes.

Given that the general scheduling is to process elements column by column, only the validity of one element needs to be checked to determine if a diagonal can be calculated. For example, calculation of diagonal element $l_{22}$ requires only element $l_{21}$. As another example, calculation of diagonal element $l_{33}$ requires elements $l_{31}$ and $l_{32}$. If $l_{32}$ is available, then $l_{31}$ must also be available, as it is required to calculate $l_{32}$. Thus, to calculate $l_{33}$, the availability of only one element, element $l_{32}$, needs to be checked. As yet another example, calculation of diagonal element $l_{88}$ requires elements $l_{81}$, $l_{82}$, $l_{83}$, $l_{84}$, $l_{85}$, $l_{86}$, and $l_{87}$. However, if $l_{87}$ is available, then all other elements must be available as they are required to calculate $l_{87}$. Thus, to calculate $l_{88}$, the availability of only one element, element $l_{87}$, needs to be checked.

For even column diagonal elements, the availability of only one element, more specifically one element from odd memory, needs to be checked. For diagonal element $l_{33}$ (whose address in even memory is equal to 8), scheduler 530 checks the availability of only element $l_{32}$ (whose odd memory non-diagonal count is 1, which is 7 less than the address of $l_{33}$). For diagonal element $l_{55}$ (whose address in even memory is equal to 14), scheduler 530 checks the availability of only element $l_{54}$ (whose odd memory non-diagonal count is 7, which is 7 less than the address of $l_{55}$). For diagonal element $l_{77}$ (whose address in even memory is equal to 18), scheduler 530 checks the availability of only element $l_{76}$ (whose odd memory non-diagonal count is 11, which is 7 less than the address of $l_{77}$).

The memory address of a diagonal element is herein represented by the variable diag_addr (or diagonal_address), whereas the odd memory non-diagonal count is herein represented by the variable odd_memwr_ndiag_cnt. As can be seen from the above examples, for diagonal elements in even columns, the following relationship holds between the memory address of the diagonal element and the odd_memwr_ndiag_cnt of the respective non-diagonal element from odd memory whose availability needs to be determined:

$$\text{odd\_memwr\_ndiag\_cnt} = \text{diag\_addr} - (N-1),$$

where N represents the number of columns or rows in the output matrix and is equal to 8 in the example of the 8 by 8 matrix L above. Thus, the even column diagonal element can be processed if odd_memwr_ndiag_cnt≧diag_addr−(N−1).

Similarly, for odd column diagonal elements, the availability of only one element, more specifically one element from even memory, needs to be checked. For diagonal element $l_{22}$ (whose address in odd memory is equal to 0), scheduler 530 checks the availability of only element $l_{21}$ (whose even memory non-diagonal count is 1, which is 1 more than the address of $l_{22}$). For diagonal element $l_{44}$ (whose address in odd memory is equal to 7), scheduler 530 checks the availability of only element $l_{43}$ (whose even memory non-diagonal count is 8, which is 1 more than the address of $l_{44}$). For diagonal element $l_{66}$ (whose address in odd memory is equal to 12), scheduler 530 checks the availability of only element $l_{65}$ (whose even memory non-diagonal count is 13, which is 1 more than the address of $l_{66}$).

Again the memory address of a diagonal element is herein represented by the variable diag_addr (or diagonal_address), whereas the even memory non-diagonal count is herein represented by the variable even_memwr_ndiag_cnt. As can be seen from the above examples, for diagonal elements in even columns, the following relationship holds between the memory address of the diagonal element and the even_memwr_ndiag_cnt of the respective non-diagonal element from even memory whose availability needs to be determined:

$$\text{even\_memwr\_ndiag\_cnt} = \text{diag\_addr} + 1$$

Thus, the odd column diagonal element can be processed if even_memwr_ndiag_cnt≧diag_addr+1.

The above method can be extended to multiple matrix decomposition using the pseudo code provided below. In one embodiment, before scheduler 530 processes a next diagonal element, it determines if all matrix elements required for calculating the next diagonal element are available in memory. The following pseudo code describes an embodiment of the method that scheduler 530 uses to determine if all matrix elements required for calculating the next diagonal element are available in memory:

```
IF EVEN diagonal THEN
    IF (odd_ memwr_col_no = sch_diag_col_no – 1) THEN
        IF (odd_ memwr_matrix_no > sch_diag_matrix_no) THEN
            Diagonal can be processed
        ELSE IF (odd_ memwr_matrix_no = sch_diag_matrix_no) THEN
            IF (odd_memwr_ndiag_cnt ≧ diagonal_address – (n – 1)) THEN
                Diagonal can be processed
            ELSE
                Cannot process the diagonal element. Wait.
            END IF
        END IF
    ELSE
        Cannot process even diagonal element. Wait
ELSE // ODD diagonal element
    IF (even_ memwr_col_no = sch_diag_col_no – 1) THEN
        IF (even_ memwr_matrix_no > sch_diag_matrix_no) THEN
            Diagonal can be processed
        ELSE IF (even_ memwr_matrix_no = sch_diag_matrix_no) THEN
            IF (even_ memwr_ndiag_cnt ≧ diagonal_address + 1) THEN
                Diagonal can be processed
            ELSE
                Cannot process the diagonal element. Wait.
            END IF
        END IF
    ELSE
        Cannot process odd diagonal element. Wait
    END IF
END
```

```
IF EVEN column THEN
    IF (odd_ memwr_col_no = sch_ndiag_col_no – 1) THEN
        IF (odd_memwr_matrix_no > sch_ndiag_matrix_no) THEN
            Element can be processed.
        ELSE IF (odd_memwr_matrix_no = sch_ndiag_matrix_no) THEN
            IF (odd_ memwr_ndiag_cnt ≧ element_addr – (n – 1)) THEN
                Element can be processed.
            ELSE
                Cannot process element. Must wait.
            END IF
        END IF
    ELSE
        Cannot process element. Must wait.
    END IF
ELSE // ODD column element
    IF (even_ memwr_col_no = sch_ndiag_col_no – 1) THEN
        IF (even_memwr_matrix_no > sch_ndiag_matrix_no) THEN
            Element can be processed.
        ELSE IF (even_memwr_matrix_no = sch_ndiag_matrix_no) THEN
            IF (even_ memwr_ndiag_cnt ≧ element_addr + 1) THEN
                Element can be processed.
            ELSE
                Cannot process element. Must wait.
            END IF
        END IF
    ELSE
        Cannot process element. Must wait.
    END IF
END IF
```

In the above method, for diagonals of even columns, if odd_memwr_col_no is equal to sch_diag_col_no–1, and if odd_memwr_matrix_no is greater than sch_diag_matrix_no, then scheduler 530 determines that the next diagonal element can be processed. Otherwise, if odd_memwr_col_no is equal to sch_diag_col_no–1, and odd_memwr_matrix_no is equal to sch_diag_matrix_no, and odd_memwr_ndiag_cnt is greater than or equal to diagonal_address–(n–1), then the next diagonal element can be processed. If all the conditions in either of the above two sentences are not met, then the next diagonal element cannot be processed and the scheduler must wait to schedule the next diagonal element. For diagonals of odd columns, if even_memwr_col_no is equal to sch_diag_col_no–1, and if even_memwr_matrix_no is greater than sch_diag_matrix_no, then scheduler 530 determines that the next diagonal element can be processed. Otherwise, if even_memwr_col_no is equal to sch_diag_col_no–1, and even_memwr_matrix_no is equal to sch_diag_matrix_no, and even_memwr_ndiag_cnt is greater than or equal to diagonal_address+1, then the next diagonal element can be processed. If all the conditions in either of the above two sentences are not met, then the next diagonal element cannot be processed and the scheduler must wait to schedule the next diagonal element.

In one embodiment, before scheduler 530 processes a non-diagonal element, it determines if all matrix elements required for calculating the next non-diagonal element are available in memory. As with the diagonal elements, only one element validity needs to be checked for each non-diagonal element. In fact, the method is identical to that for the diagonal elements with the only difference being that the scheduler counters used are for the non-diagonal elements. The following pseudo code (where the memory address of the non-diagonal element is represented by the variable element_addr) describes an embodiment of the method that scheduler 530 uses to determine if all matrix elements required for calculating the non-diagonal element are available in memory:

Below is a brief throughput analysis of the embodiments of the matrix decomposition circuit of the present invention, such as matrix decomposition circuit 500, which are capable of performing one complex MAC per clock cycle and are designed to ensure the scheduler is stalled for a minimum amount of time (if at all). In the below analysis, two measures are provided, a theoretical upper limit and a pessimistic lower level with the assumption that the inverse square root unit is fully pipelined. In reality, the throughput will be somewhere between these two values. Moreover, the actual throughput will depend on the actual implementation. In the below analysis, in addition to some variables that have already been defined above, such as M and N, the following variables are also used:

NMACs=number of multiply and accumulate operations required for each matrix to decompose (ignores any in square root operation for diagonal), which is equal to $N^3/6$ taken from numerical recipes in the C Programming Language literature;

Nelements=number of output elements in each matrix to decompose, which is equal to $(N^2+N)/2$; and Tinv_sqrt=number of cycles to calculate inverse square root.

For the theoretical upper limit, it is assumed that the scheduler is never stalled and is performing one complex MAC operations per clock cycle. It is also assumed that the inverse square root unit and the PU are fully pipelined. As the PU is fully pipelined, the subtraction from the input element and multiplication with the inverse square root are hidden within the cycles that the MAC operations are occurring. With the above assumptions, the decomposition_duration, i.e., the time it takes to decompose all M input matrices to M output matrices, is provided by the following equation:

Decomposition_duration=$M*N^3/6$+Delay in calculating inverse square roots for diagonal elements for all matrices For single matrix decompositions each column diagonal will be calculated at different times. However, it is likely that the inverse square root operation will be overlapped with MAC operations for non-diagonal elements. However, for simplicity and also to add a margin of error, it will be assumed there is no such overlap. For the multiple matrix decomposition case, if the same assumption is made, then the results would be pessimistic, as opposed to offering the upper limit. Thus, for the multiple matrix decomposition case, it is assumed that (1) the inverse square root operation for one diagonal in each column for one matrix is not overlapped with any MAC operations and (2) all remaining matrix diagonal inverse square root operations are overlapped with MAC operations. With these additional assumptions, the result for the theoretical upper limit of performance is as follows:

$$\text{Decomposition\_duration} = M*N^3/6 + \text{Tinv\_sqrt}*N + (M-1)*N$$

The pessimistic lower level is not the absolute worst case performance, but a realistic worst case, assuming the intention is to design the system to maximize performance. The upper limit performance formula is modified assuming that the scheduler has to be stalled to allow each output element to be written by the PU to memory. The number of cycles of stall is taken to be equal to the number of output elements. With these assumptions, the results for the pessimistic lower level performance is as follows:

$$\text{Decomposition\_duration} = M*N^3/6 + \text{Tinv\_sqrt}*N + (M-1)*N + M*(N^2+N)/2$$

Matrix decomposition circuits embodying the present invention might be included in a variety of integrated circuits (ICs), including ICs that are PLDs or application specific integrated circuits (ASICs). PLDs (also sometimes referred to as complex PLDs (CPLDs), programmable array logic (PALs), programmable logic arrays (PLAs), field PLAs (FPLAs), erasable PLDs (EPLDs), electrically erasable PLDs (EEPLDs), logic cell arrays (LCAs), field programmable gate arrays (FPGAs), or by other names) provide the advantages of fixed ICs with the flexibility of custom ICs. Such devices typically provide an "off the shelf" device having at least a portion that can be programmed to meet a user's specific needs. ASICs have traditionally been fixed ICs. However, it is possible to provide an ASIC that has a portion or portions that are programmable. Thus, it is possible for an IC device to have qualities of both an ASIC and a PLD. The term PLD as used herein will be considered broad enough to include such devices.

PLDs have configuration elements that may be programmed or reprogrammed. Configuration elements may be realized as RAM bits, flip-flops, electronically erasable programmable read-only memory (EEPROM) cells, or other memory elements. Placing new data into the configuration elements programs or reprograms the PLD's logic functions and associated routing pathways. Configuration elements that are field programmable are often implemented as RAM cells (sometimes referred to a "configuration RAM" (CRAM)). However, many types of configurable elements may be used including static or dynamic RAM (SRAM or DRAM), electrically erasable read-only memory (EEROM), flash, fuse, and anti-fuse programmable connections. The programming of configuration elements could also be implemented through mask programming during fabrication of the device. While mask programming may have disadvantages relative to some of the field programmable options already listed, it may be useful in certain high volume applications.

Figure 9:
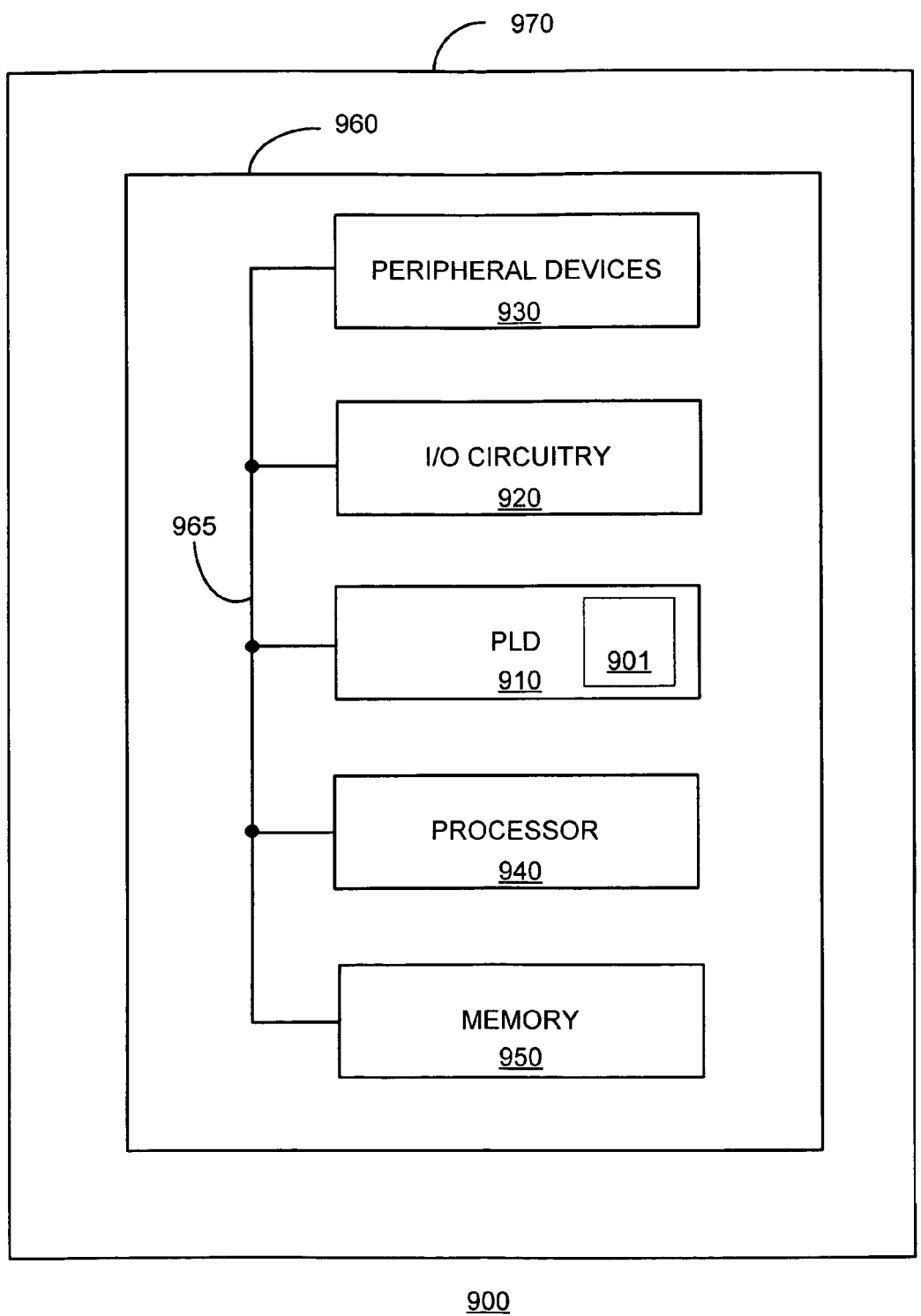
FIG. 9 illustrates an exemplary data processing system including a programmable logic device in which matrix decomposition circuits in accordance with the present invention might be implemented.

FIG. 9 illustrates an exemplary data processing system including a PLD in which matrix decomposition circuits in accordance with the present invention might be implemented. In FIG. 9, data processing system 900, among other things, includes PLD 910. As one example, matrix decomposition circuits of the present invention may be implemented in PLDs such as PLD 910. In one embodiment, matrix decomposition circuit 901 (such as matrix decomposition circuit 100, 200, 300, 400 or 500, shown in FIG. 1, 2, 3, 4, or 5, respectively) is on the same die/chip as PLD 910. Data processing system 900 may include one or more of the following components: processor 940, memory 950, input/output (I/O) circuitry 920, and peripheral devices 930. These components are coupled together by system bus 965 and are populated on circuit board 960 which is contained in end-user system 970. A data processing system such as system 900 may include a single end-user system such as end-user system 970 or may include a plurality of systems working together as a data processing system.

System 900 can be used in a wide variety of applications, such as computer networking, data networking, instrumentation, video processing, digital signal processing (DSP), or any other application where the advantage of using programmable or reprogrammable logic is desirable. PLD 910 can be used to perform a variety of different logic functions. For example, PLD 910 can be configured as a processor or controller that works in cooperation with processor 940 (or, in alternative embodiments, a PLD might itself act as the sole system processor). PLD 910 may also be used as an arbiter for arbitrating access to a shared resource in system 900. In yet another example, PLD 910 can be configured as an interface between processor 940 and one of the other components in system 900. It should be noted that system 900 is only exemplary.

In one embodiment, system 900 is a digital system. As used herein a digital system is not intended to be limited to a purely digital system, but also encompasses hybrid systems that include both digital and analog subsystems.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A matrix decomposition circuit comprising:
   a memory;
   one or more memory counters to track one or more memory counter values regarding data stored in the memory;
   a processing unit that calculates elements of an output matrix; and
   a scheduler that determines an order for calculating the elements of the output matrix, wherein the scheduler uses one or more memory counter values to determine whether data needed for processing an element of the output matrix is available in the memory.

2. The matrix decomposition circuit of claim 1, the scheduler schedules processing of a diagonal element of the output matrix to occur as soon as the scheduler determines that each element of the output matrix needed for calculating the diagonal element is available in the memory.

3. The matrix decomposition circuit of claim 1 further comprising:
   an inverse square root unit that calculates inverse of each diagonal element of the output matrix.

4. The matrix decomposition circuit of claim 3, wherein:
the memory comprises a two port memory that stores elements of an input matrix and the elements of the output matrix;
the scheduler reads required data from the two port memory via a first port of the two port memory; and
the processing unit writes output data to the two port memory via a second port of the two port memory.

5. The matrix decomposition circuit of claim 3, wherein:
the memory comprises an input memory and an output memory, wherein the input memory stores elements of an input matrix and the output memory stores the elements of the output matrix;
the scheduler reads required data from the input memory and the output memory via a first port of the input memory and a first port of the output memory, respectively; and
the processing unit writes output data to the output memory via a second port of the output memory.

6. The matrix decomposition circuit of claim 3, wherein:
the memory comprises an odd memory and an even memory, wherein the odd memory stores elements of odd columns of an input matrix and elements of odd columns of the output matrix, and the even memory stores elements of even columns of the input matrix and elements of even columns of the output matrix;
the scheduler comprises a first scheduler and a second scheduler, wherein the first scheduler reads required data from the odd memory and the even memory via a first port of the odd memory and a first port of the even memory, respectively, and the second scheduler reads required data from the odd memory and the even memory via a second port of the odd memory and a second port of the even memory, respectively; and
the processing unit comprises a first processing unit and a second processing unit, wherein the first processing unit writes output data to the odd memory and the even memory via the first port of the odd memory and the first port of the even memory, respectively, and the second processing unit writes output data to the odd memory and the even memory via the second port of the odd memory and the second port of the even memory, respectively.

7. The matrix decomposition circuit of claim 3, wherein:
the memory comprises a first memory and a second memory, wherein the first memory stores elements of an input matrix and intermediate results of the output matrix, and the second memory stores the elements of the output matrix;
the scheduler reads required data from the first memory and the second memory via a first port and a second port of the first memory and a first port and a second port of the second memory, respectively; and
the processing unit writes the intermediate results to the first memory via the second port of the first memory and the elements of the output matrix to the second memory via the second port of the second memory.

8. The matrix decomposition circuit of claim 3, wherein:
the memory comprises an odd memory and an even memory, wherein the odd memory stores elements of odd columns of an input matrix and elements of odd columns of the output matrix, and the even memory stores elements of even columns of the input matrix and elements of even columns of the output matrix;

the scheduler reads required data from the odd memory via a first port and a second port of the odd memory and from the even memory via a first port and a second port of the even memory; and
the processing unit writes output data to the odd memory via a second port of the odd memory and to the even memory via a second port of the even memory.

9. The matrix decomposition circuit of claim 1, wherein each element address in the memory includes a matrix number for an input matrix being decomposed and an address of an input or output element stored in the memory.

10. The matrix decomposition circuit of claim 1 further comprising:
scheduler counters, wherein the scheduler counters include four counters, wherein a first to a fourth of the four counters respectively track values representing (i) a column number of a next diagonal to process, (ii) a matrix number of the next diagonal to process, (iii) a matrix number of a non-diagonal element being processed or to be processed, and (iv) a column number of the non-diagonal elements being processed or to be processed;
wherein the one or more memory counters include five counters, wherein a first to a fifth of the five counters respectively track values representing (i) a column number of a last diagonal element of the output matrix written to the memory, (ii) a matrix number for the last diagonal element written to the memory, (iii) a current column number for non-diagonal elements being written to the memory, (iv) a matrix number for a last non-diagonal element written to the memory, and (v) a total count of non-diagonal elements that have been written to the memory.

11. The matrix decomposition circuit of claim 1, wherein the scheduler generates addresses to read data from the memory, and sends the data read from the memory to the processing unit.

12. A programmable logic device including the matrix decomposition circuit of claim 1.

13. A digital system comprising a programmable logic device including the matrix decomposition circuit of claim 1.

14. A method of matrix decomposition, the method comprising:
determining whether data required for calculating an element of an output matrix is available in memory by using one or more memory counter values that track one or more values regarding data available in the memory;
scheduling calculation of the element of the output matrix; and
calculating the element of the output matrix.

15. The method of claim 14, wherein calculation of a diagonal element of the output matrix is scheduled to occur as soon as a scheduler determines that each element of the output matrix needed for the calculation is available in the memory.

16. The method of claim 14, wherein a plurality of input matrices are decomposed into a plurality of output matrices, the method further comprising:
after scheduling processing of an entire column of non-diagonal elements of a column C of output matrix m of the plurality of output matrices, where C is an integer representing a column number and m is an integer representing a matrix number, determining which diagonal elements can be processed;
scheduling processing of all diagonal elements that can be processed; and after scheduling the processing of all the diagonal elements that can be scheduled, scheduling processing of non-diagonal elements of column C of matrix m+1 or column C+1 of matrix m.

17. The method of claim 14 further comprising:
storing in an odd memory elements of odd columns of an input matrix and elements of odd columns of the output matrix;
storing in an even memory elements of even columns of the input matrix and elements of even columns of the output matrix;
reading required data from the odd memory via a first port and a second port of the odd memory and from the even memory via a first port and a second port of the even memory; and
writing output data to the odd memory via a second port of the odd memory and to the even memory via a second port of the even memory.

18. The method of claim 17, wherein:
the writing the output data to the odd memory occurs when there is no reading of data in the odd memory via the second port of the odd memory; and
the writing the output data to the even memory occurs when there is no reading of data in the even memory via the second port of the even memory.

19. The method of claim 14 further comprising:
storing in a processing unit a copy of a diagonal element of the output matrix, a non-diagonal element of an even column of the output matrix, and a non-diagonal element of an odd column of the output matrix.

20. The method of claim 19 further comprising:
determining if calculation of an output element requires an element stored in the processing unit;
if the calculation of the output element requires the element stored in the processing unit, then indicating to the processing unit to use the element stored in the processing unit.

21. The method of claim 14, wherein for calculating a diagonal element:
reading a non-diagonal element of the output matrix from the memory;
sending the non-diagonal element of the output matrix to a processing unit; and
signaling to the processing unit to multiply the non-diagonal element with its conjugate.

22. The method of claim 14, wherein the determining includes determining whether a last element needed to calculate the element of the output matrix is available in the memory.

23. The method of claim 14, wherein the scheduling the calculation of the element of the output matrix occurs only if the required data for calculating the element of the output matrix is available in the memory.

24. A matrix decomposition circuit comprising:
an odd memory that stores elements of odd columns of an input matrix and elements of odd columns of an output matrix;
an even memory that stores elements of even columns of the input matrix and elements of even columns of the output matrix;
a processing unit that calculates elements of the output matrix, the processing unit writes output data to the odd memory via a second port of the odd memory and to the even memory via a second port of the even memory; and
a scheduler that determines an order for calculating the elements of the output matrix, wherein the scheduler generates addresses to read data from the odd memory and the even memory, and sends the data read from the odd memory and the even memory to the processing unit, the scheduler reads required data from the odd memory via a first port and a second port of the odd memory and from the even memory via a first port and a second port of the even memory.

25. The matrix decomposition circuit of claim 24 further comprising:
an inverse square root unit that calculates inverse of each diagonal element of the output matrix.

* * * * *